METHOD AND MEANS FOR INSPECTING CONTAINERS

Filed Sept. 15, 1958 17 Sheets-Sheet 1

INVENTORS
FREDERICK Z. FOUSE
JAY F. KIDWELL
BY
Norman N. Holland
ATTORNEY

Dec. 11, 1962 F. Z. FOUSE ET AL 3,067,872

METHOD AND MEANS FOR INSPECTING CONTAINERS

Filed Sept. 15, 1958 17 Sheets-Sheet 2

INVENTORS
FREDERICK Z. FOUSE
JAY F. KIDWELL
BY
[signature]
ATTORNEY

METHOD AND MEANS FOR INSPECTING CONTAINERS

Filed Sept. 15, 1958 17 Sheets-Sheet 3

INVENTORS
FREDERICK Z. FOUSE
JAY F. KIDWELL
BY
Norman d. Holland
ATTORNEY

METHOD AND MEANS FOR INSPECTING CONTAINERS

Filed Sept. 15, 1958 17 Sheets-Sheet 4

INVENTORS
FREDERICK Z. FOUSE
JAY F. KIDWELL
BY
Norman N. Holland
ATTORNEY

METHOD AND MEANS FOR INSPECTING CONTAINERS

INVENTORS
FREDERICK Z. FOUSE
JAY F. KIDWELL
BY
Norman N. Holland
ATTORNEY

Dec. 11, 1962 F. Z. FOUSE ET AL 3,067,872

METHOD AND MEANS FOR INSPECTING CONTAINERS

Filed Sept. 15, 1958 17 Sheets-Sheet 6

INVENTORS
FREDERICK Z. FOUSE
JAY F. KIDWELL

BY

Norman N. Holland
ATTORNEY

Dec. 11, 1962 F. Z. FOUSE ET AL 3,067,872

METHOD AND MEANS FOR INSPECTING CONTAINERS

Filed Sept. 15, 1958 17 Sheets-Sheet 7

INVENTORS
FREDERICK Z. FOUSE
JAY F. KIDWELL

BY Norman N. Holland
ATTORNEY

METHOD AND MEANS FOR INSPECTING CONTAINERS

Filed Sept. 15, 1958 17 Sheets-Sheet 8

INVENTORS
FREDERICK Z. FOUSE
JAY F. KIDWELL
BY
Norman N. Holland
ATTORNEY

Dec. 11, 1962 F. Z. FOUSE ET AL 3,067,872

METHOD AND MEANS FOR INSPECTING CONTAINERS

Filed Sept. 15, 1958 17 Sheets-Sheet 9

INVENTORS
FREDERICK Z. FOUSE
JAY F. KIDWELL

BY

Norman N. Holland

ATTORNEY

Dec. 11, 1962 F. Z. FOUSE ET AL 3,067,872

METHOD AND MEANS FOR INSPECTING CONTAINERS

Filed Sept. 15, 1958 17 Sheets-Sheet 10

INVENTORS
FREDERICK Z. FOUSE
JAY F. KIDWELL

BY

Norman N. Holland
ATTORNEY

INVENTORS
FREDERICK Z. FOUSE
JAY F. KIDWELL
BY
Norman N. Holland
ATTORNEY

METHOD AND MEANS FOR INSPECTING CONTAINERS

Filed Sept. 15, 1958 17 Sheets-Sheet 12

INVENTORS
FREDERICK Z. FOUSE
JAY F. KIDWELL
BY
Norman N. Holland
ATTORNEY

METHOD AND MEANS FOR INSPECTING CONTAINERS

Filed Sept. 15, 1958 17 Sheets-Sheet 13

INVENTORS
FREDERICK Z. FOUSE
JAY F. KIOWELL
BY
Norman Holland
ATTORNEY

METHOD AND MEANS FOR INSPECTING CONTAINERS

Filed Sept. 15, 1958 17 Sheets-Sheet 14

INVENTORS
FREDERICK Z. FOUSE
JAY F. KIDWELL
BY
ATTORNEY

METHOD AND MEANS FOR INSPECTING CONTAINERS

Filed Sept. 15, 1958 17 Sheets-Sheet 15

INVENTORS
FREDERICK Z. FOUSE
JAY F. KIDWELL
BY
[signature]
ATTORNEY

METHOD AND MEANS FOR INSPECTING CONTAINERS

Filed Sept. 15, 1958 17 Sheets-Sheet 16

INVENTORS
FREDERICK Z. FOUSE
JAY F. KIDWELL
BY
Norman N. Holland
ATTORNEY

METHOD AND MEANS FOR INSPECTING CONTAINERS

Filed Sept. 15, 1958 17 Sheets-Sheet 17

INVENTORS
FREDERICK Z. FOUSE
JAY F. KIDWELL
BY
Norman N. Holland
ATTORNEY

United States Patent Office 3,067,872

Patented Dec. 11, 1962

3,067,872

METHOD AND MEANS FOR INSPECTING CONTAINERS

Frederick Z. Fouse and Jay Fred Kidwell, Lancaster, Ohio, assignors to Anchor Hocking Glass Corporation, Lancaster, Ohio, a corporation of Delaware Filed Sept. 15, 1958, Ser. No. 761,188

10 Claims. (Cl. 209—75)

The present invention relates to an inspection machine for detecting flaws in transparent containers and more particularly to a high-speed automatic flaw detector adapted for use in container production or for operation in line with automatic container filling and sealing machinery.

Modern container filling and sealing machinery fills and seals containers automatically at high speeds. The containers fed into such filling and sealing machinery must be free from flaws or defects which weaken the container or impair the seal or which permit or cause contamination of the sealed product. In order to minimize the cost of filling and sealing containers, it is desirable for all of the operations, including the inspection of the containers, to be carried out rapidly and efficiently with a minimum usage of personnel and with a high degree of reliability. It is particularly necessary in the packaging of food products that the containers be free of any flaws which might interfere with the provision of a tight seal or which might result in the distribution of weakened, chipped, or cracked containers to the consumer. Certain irregularities in containers are not objectionable and it therefore is desirable to have an inspection machine which will discriminate between these and harmful flaws. In the control of the container manufacture it is also helpful to know what flaws are occuring and it is therefore desirable to have an inspection machine which can distinguish between the different types of defects and count and record the total number of each type of flaw.

Accordingly, an object of the present invention is to provide an efficient, high-speed automatic container inspection machine which is adapted to detect the flaws or defects which might occur in glass or other transparent containers and to reject these containers.

Another object of the present invention is to provide a container inspection machine adapted to inspect the finish, the shoulder, and the body of a transparent container.

Another object of the present invention it to provide a high-speed inspection machine for containers which is extremely reliable.

Another object of the present invention is to provide an inspection machine for transparent containers which is capable of detecting and discriminating between a wide range of flaws or defects of differing character and location in the containers.

An other object of the present invention is to provide a container inspection machine adapted to distingish between different types of flaws and to count and record the total of each of the types of flaws.

Another object of the present invention is to provide a high-speed inspection machine for transparent containers which is extremely reliable.

Another object of the present invention is to provide an inspection machine for glass containers which is capable of detecting a wide range of flaws or defects of differing character and location in glass containers and of distinguishing between the different flaws.

Another object of the present invention is to provide an inspection machine for transparent containers adapted for use with containers of differing sizes.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 1:
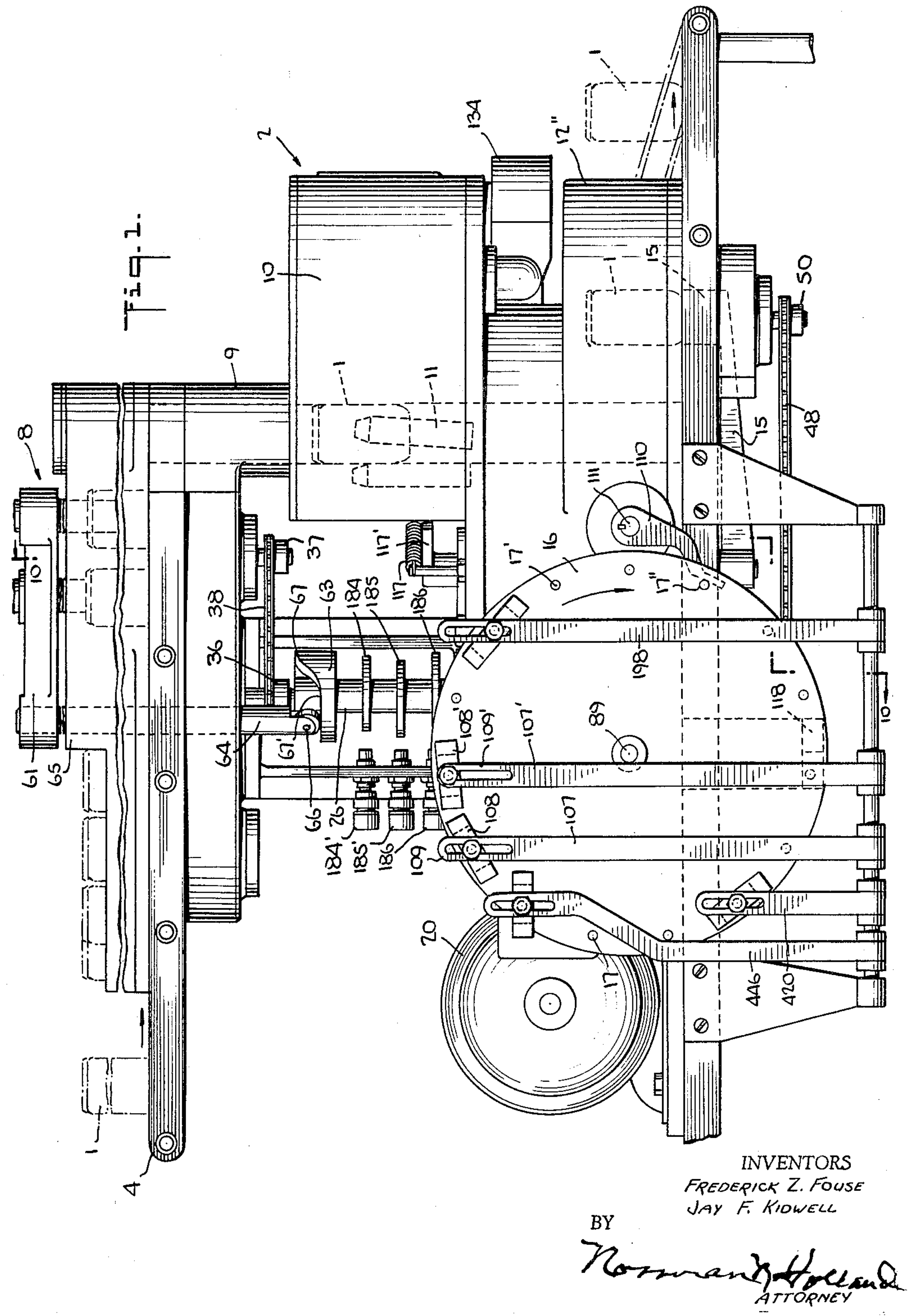
FIG. 1 is a side elevational view partially cut away of the automatic selector.
Figure 2:
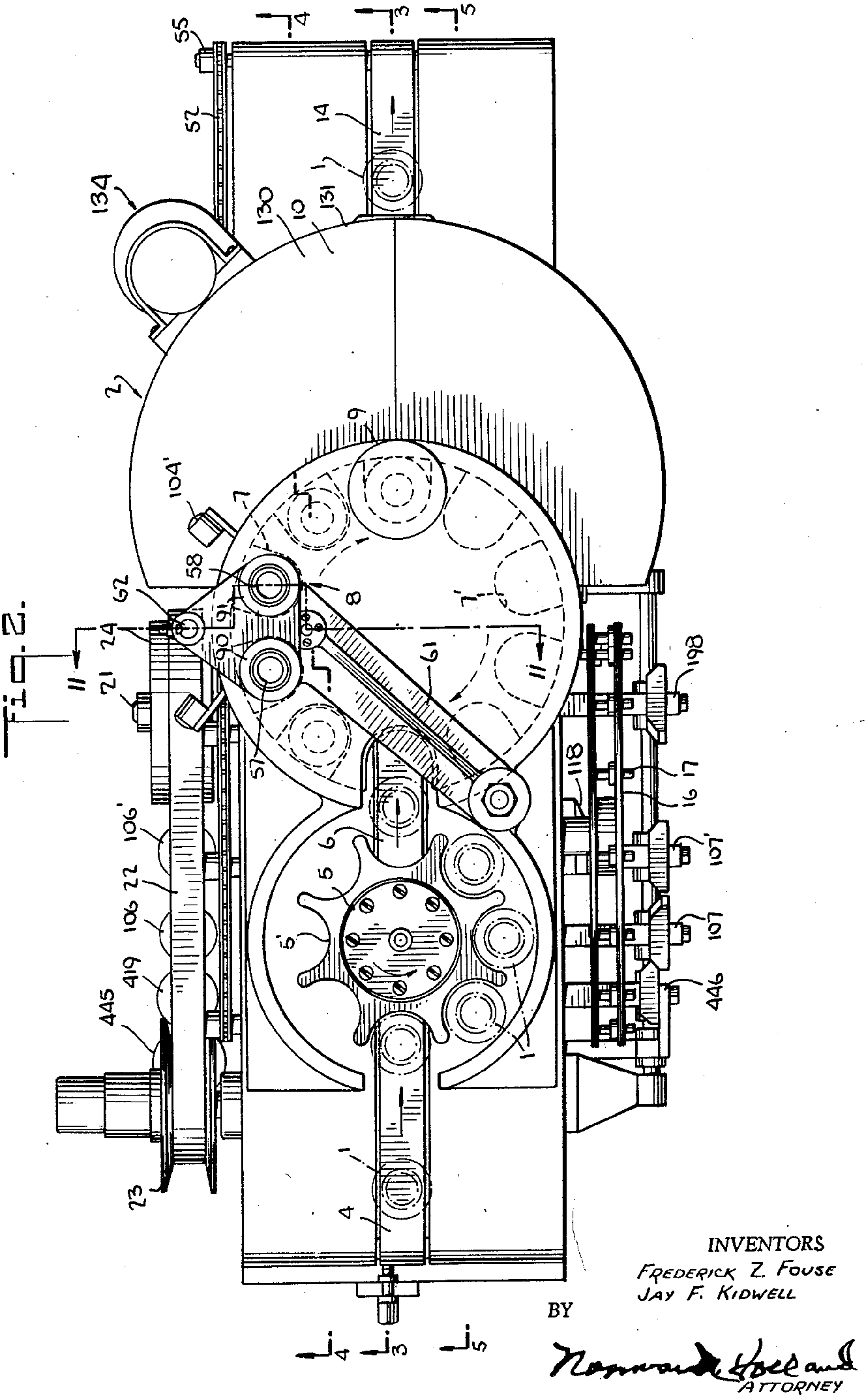
FIG. 2 is a top plan view of the automatic selector.
Figure 3:
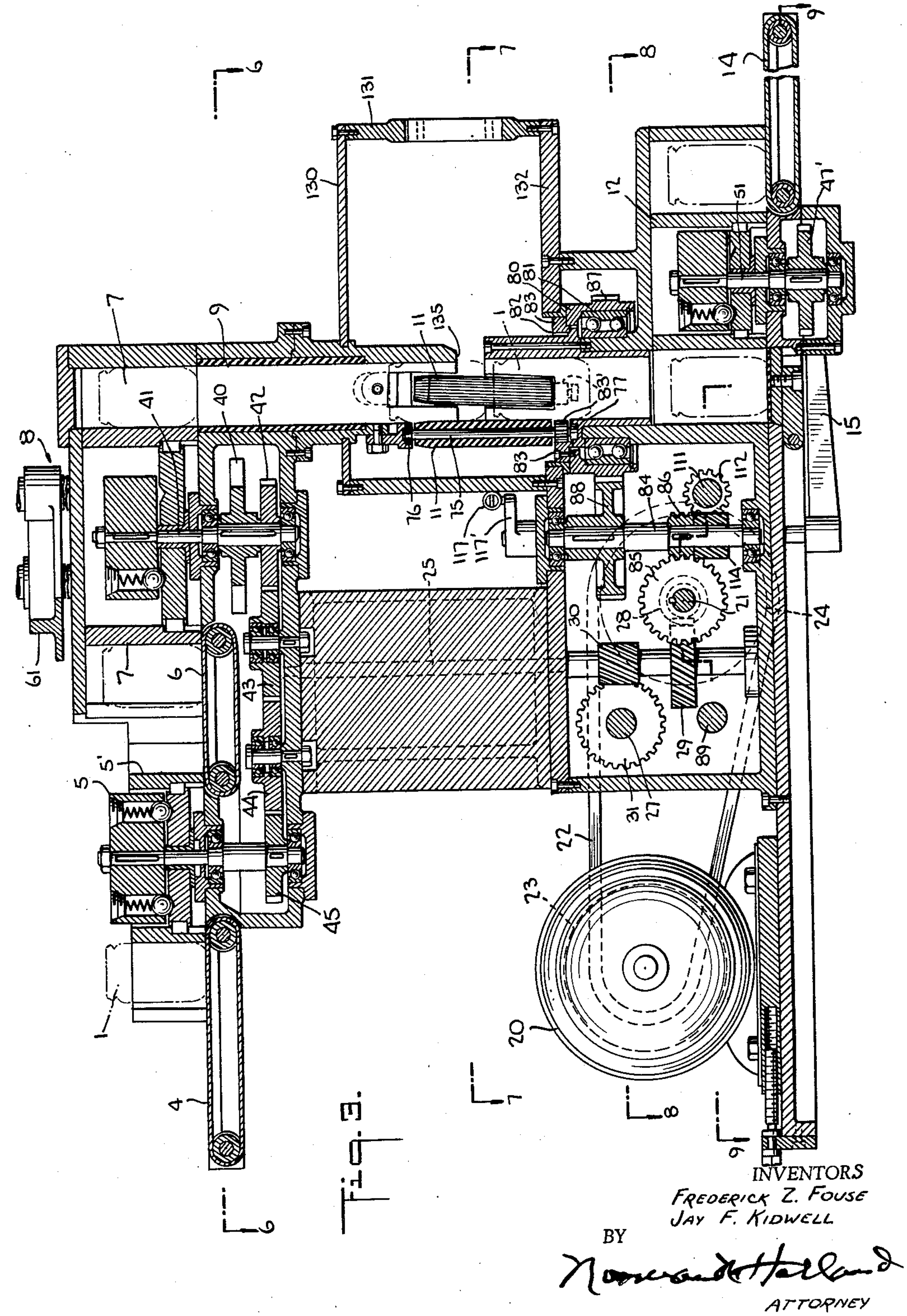
Figure 4:
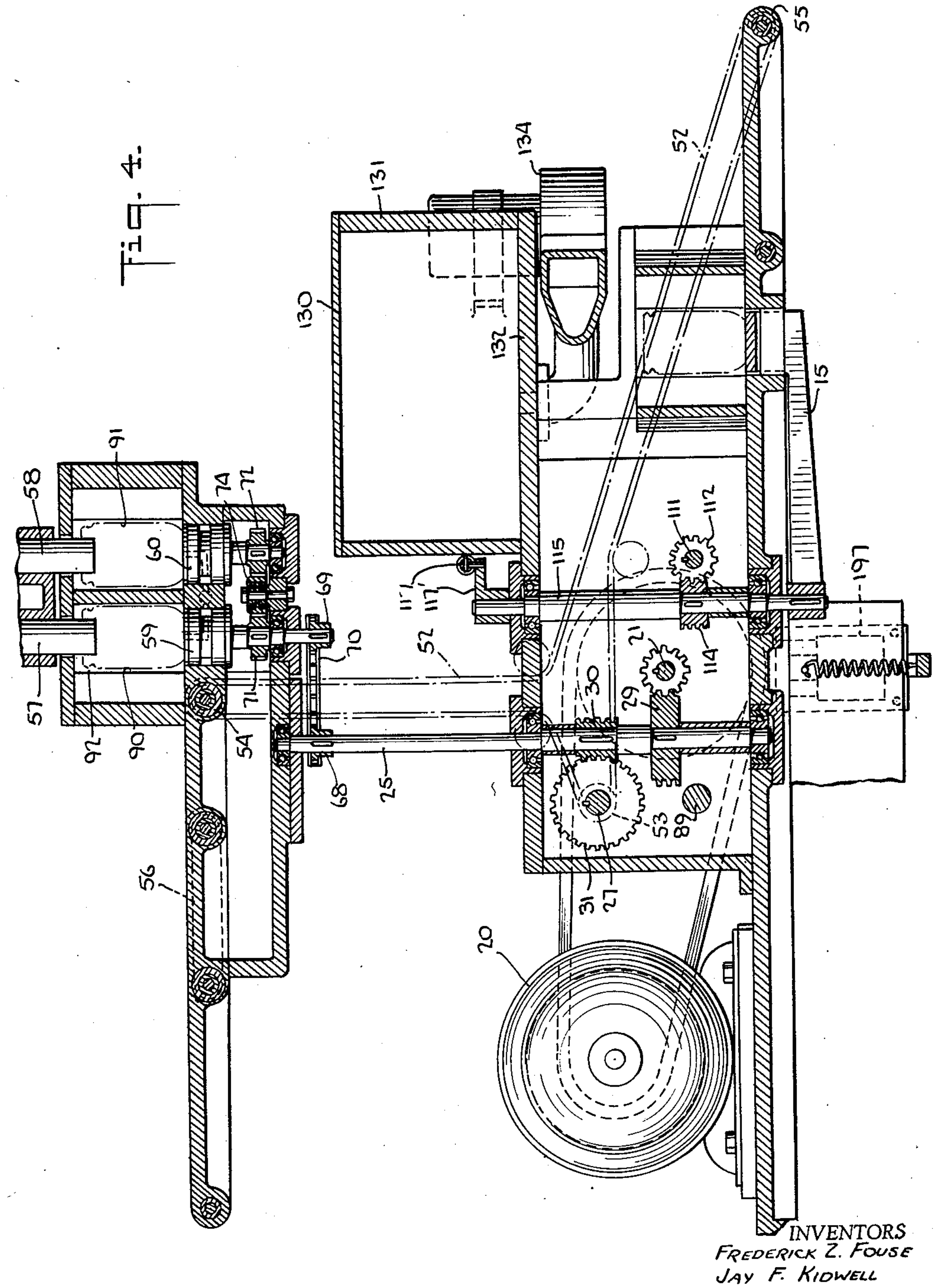
Figure 5:
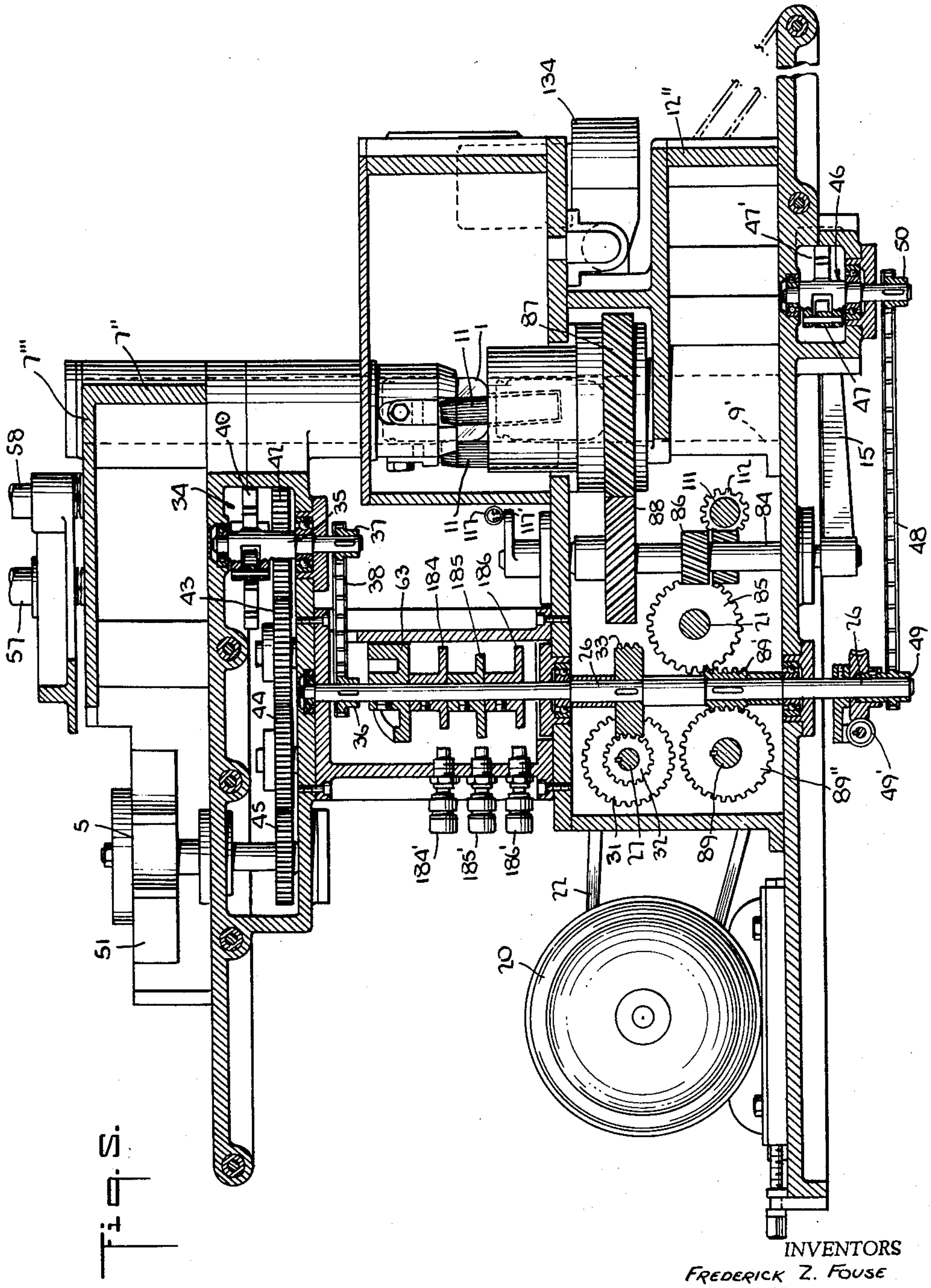
Figure 7:
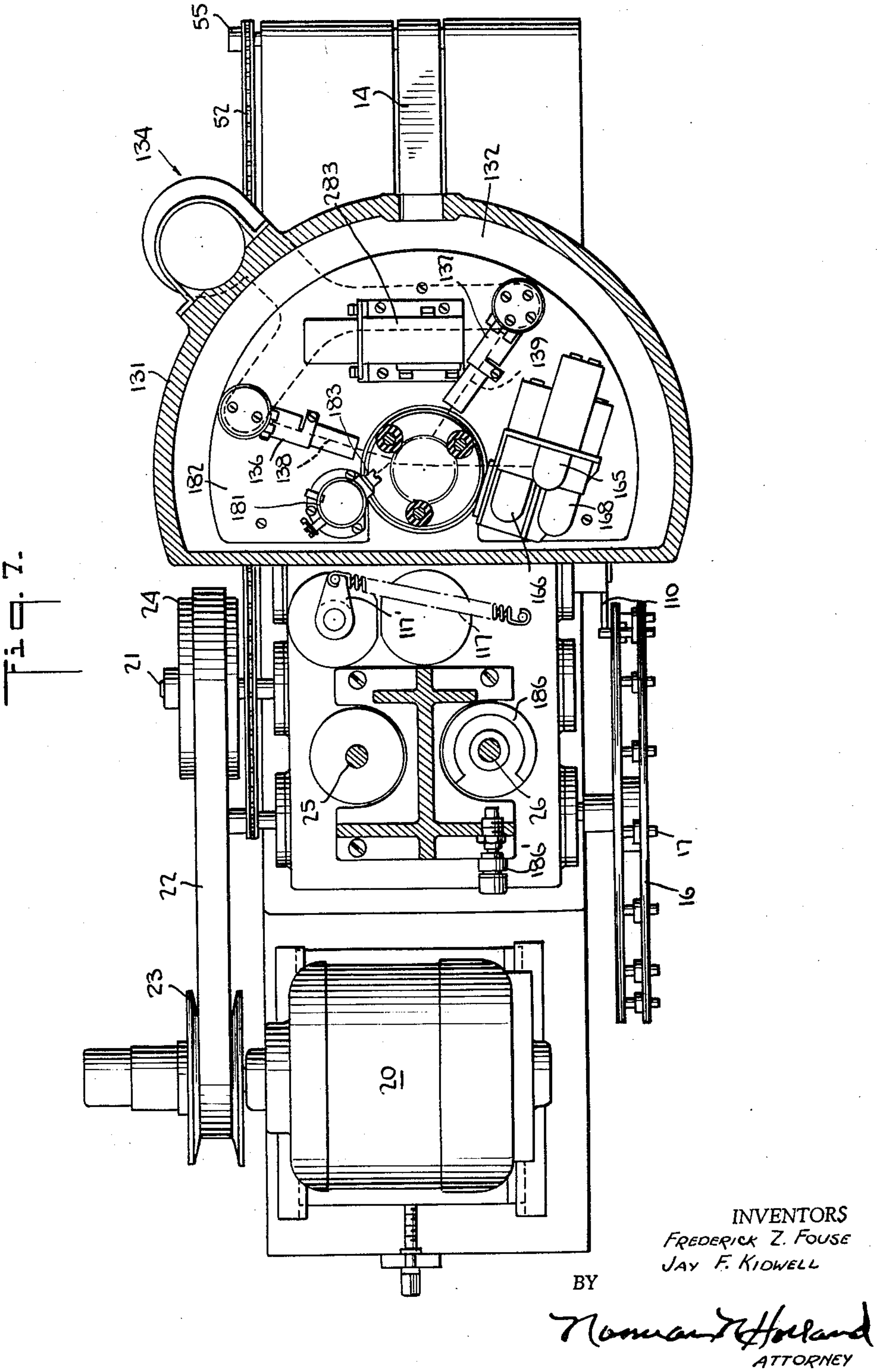
Figure 10:
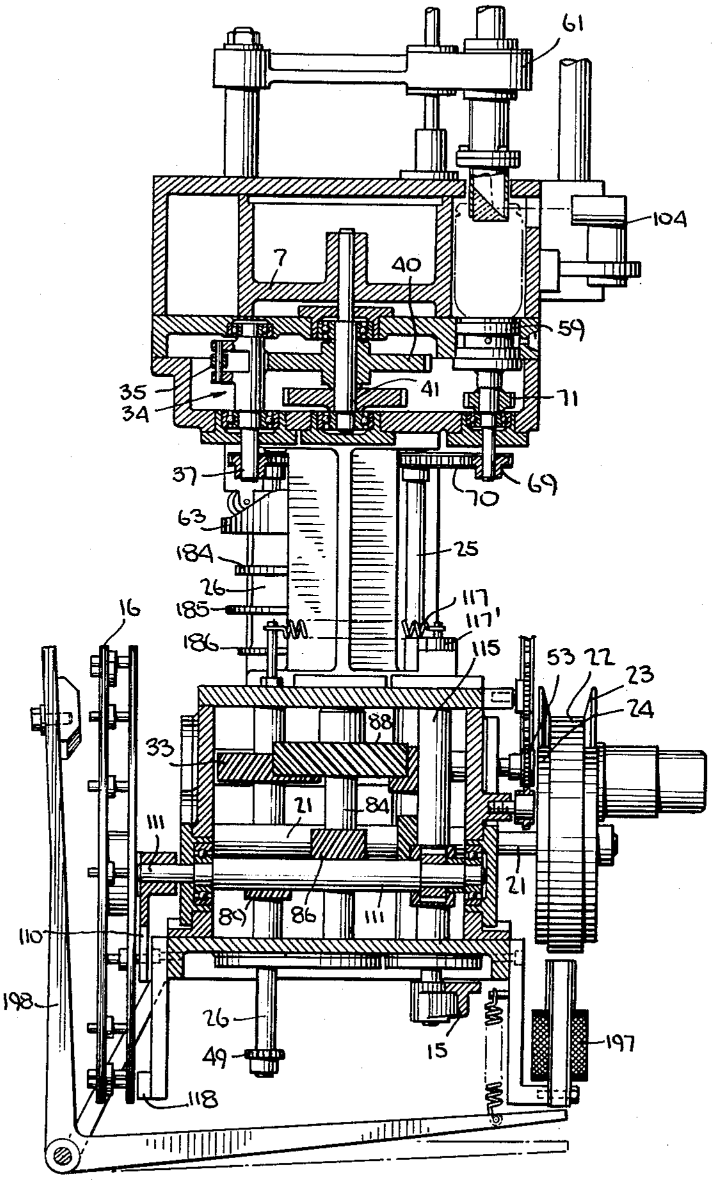
Figure 11:
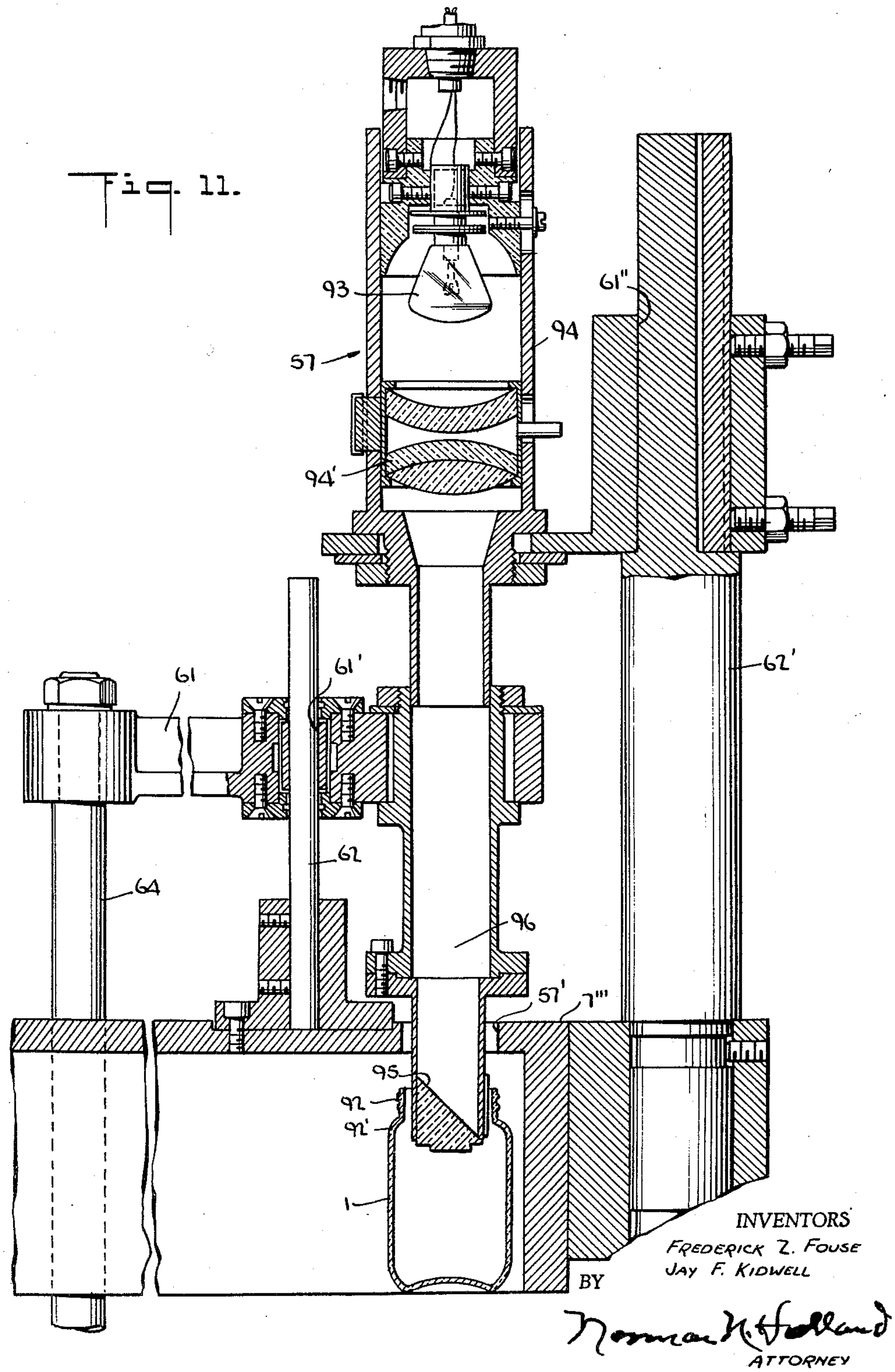
Figure 7A:
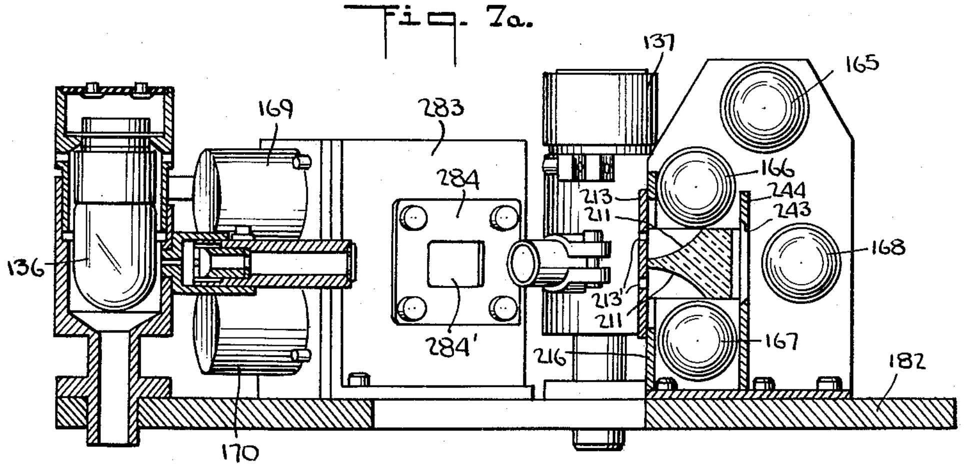
Figure 12:
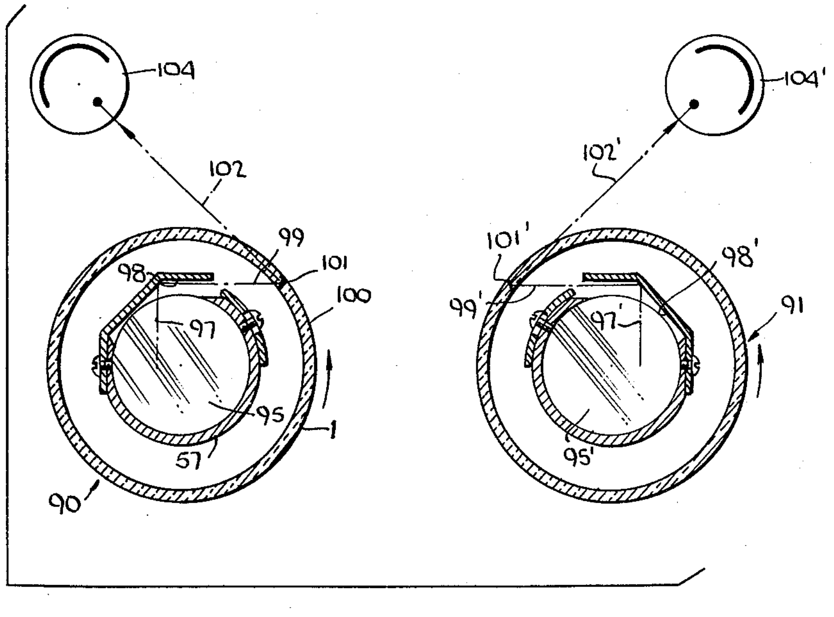
Figures 13, 14, 15:
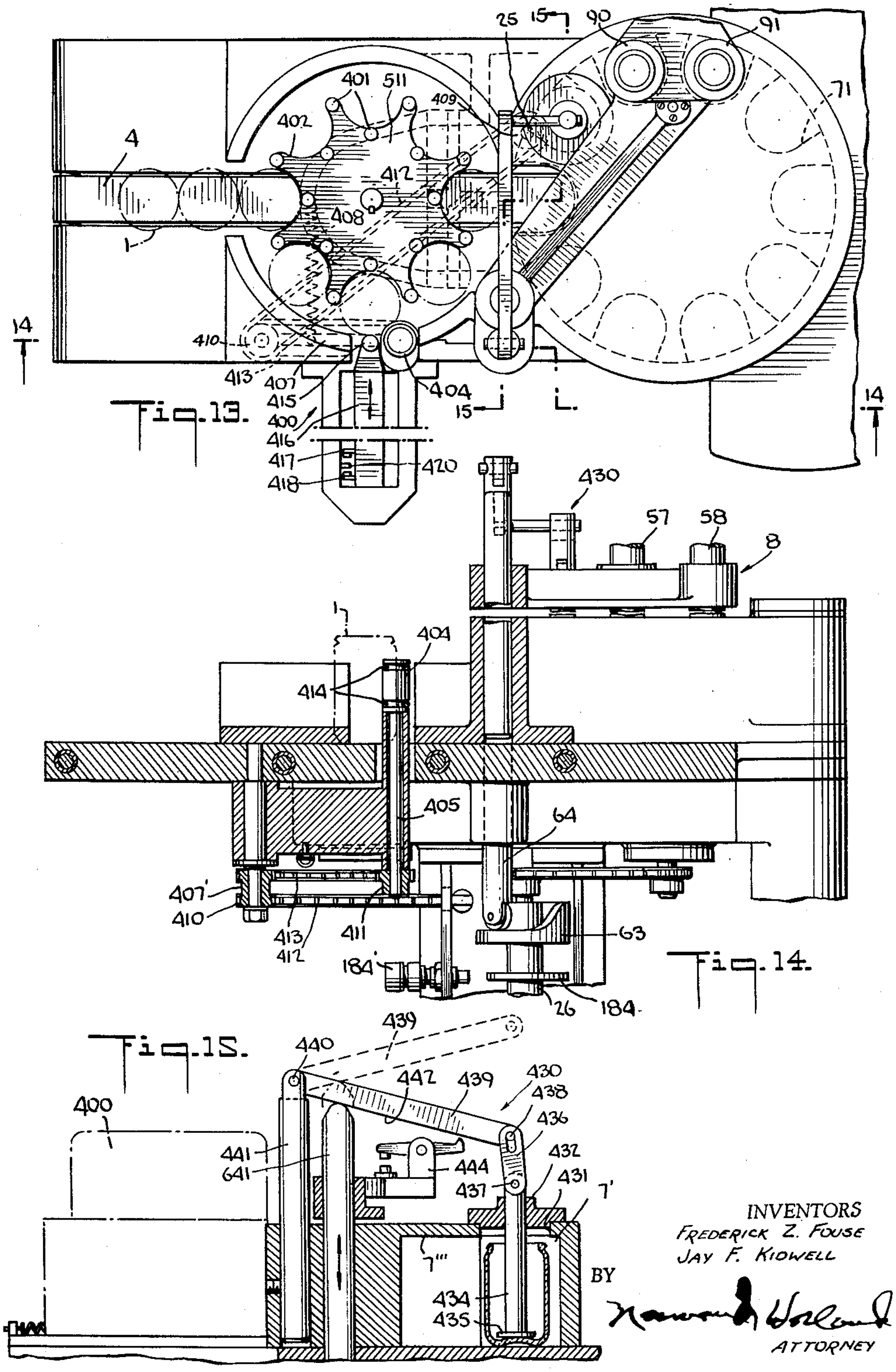
Figure 16:
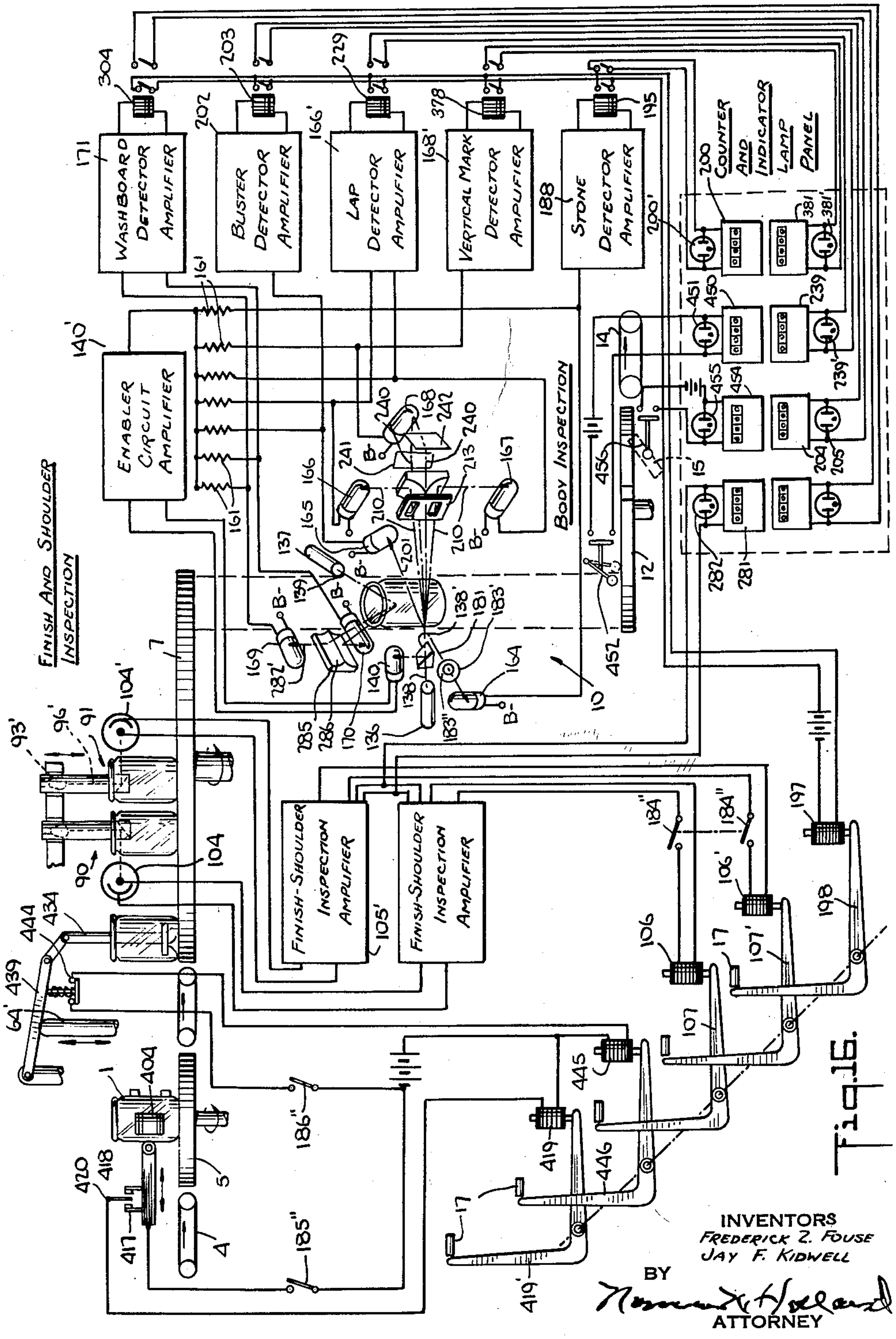
Figure 17:
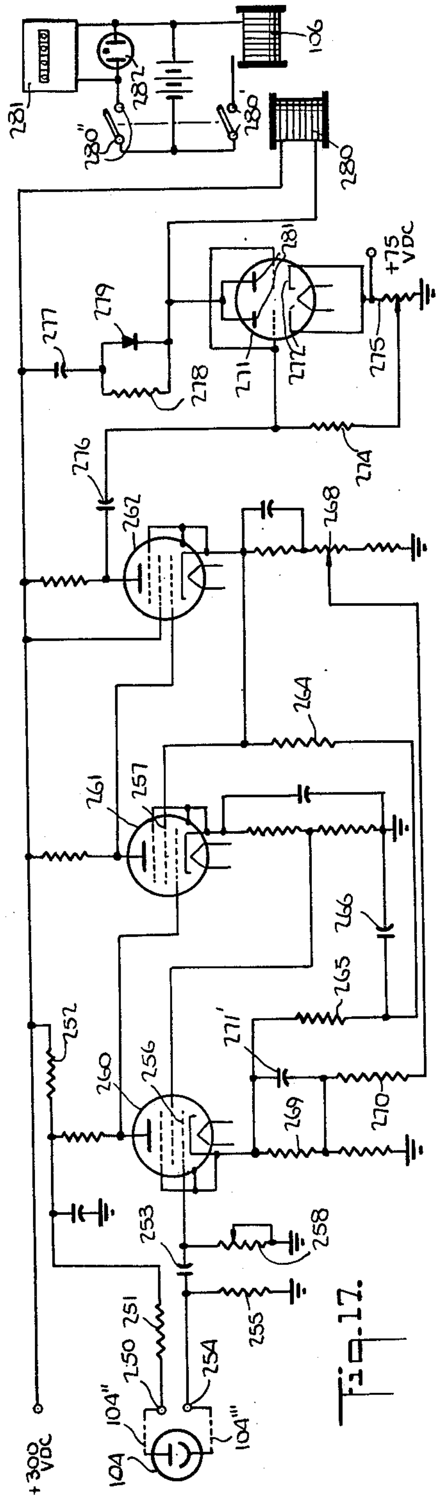
Figure 18:
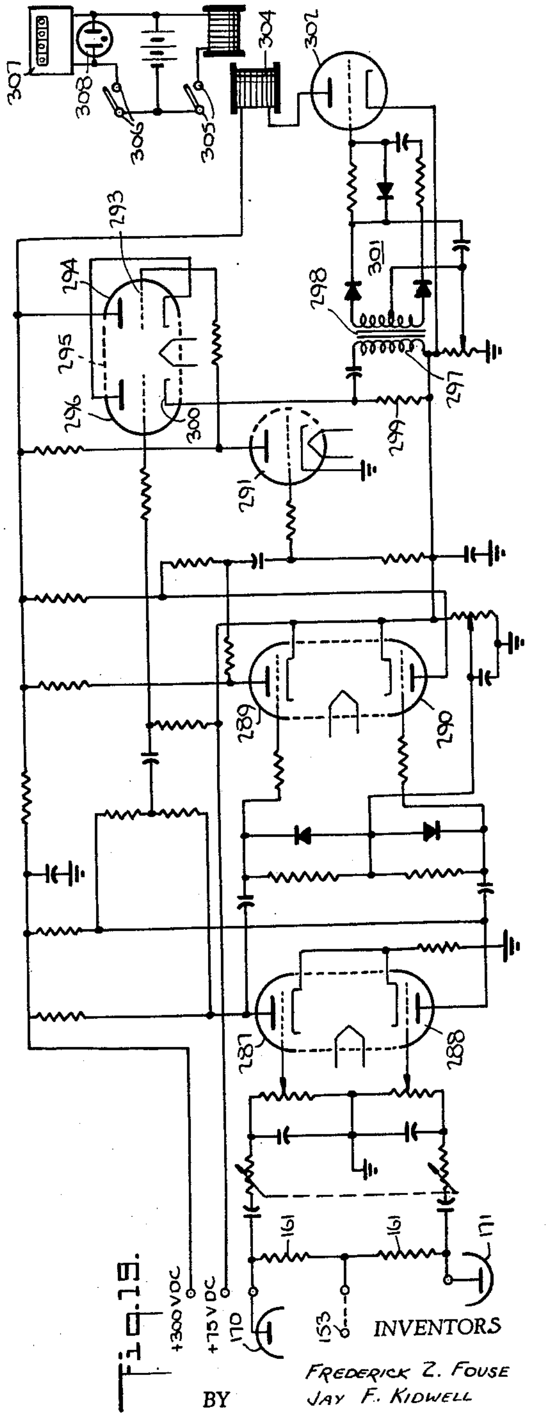
Figure 18:
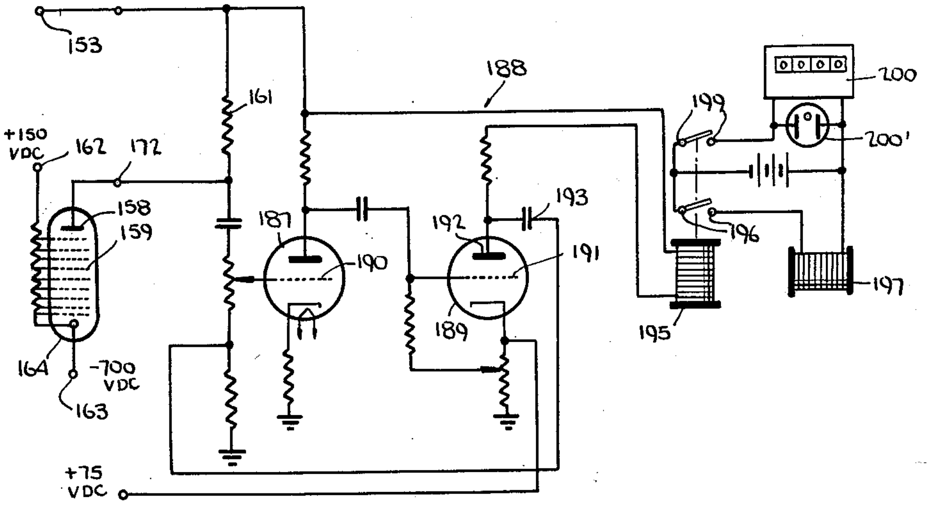
Figure 22:
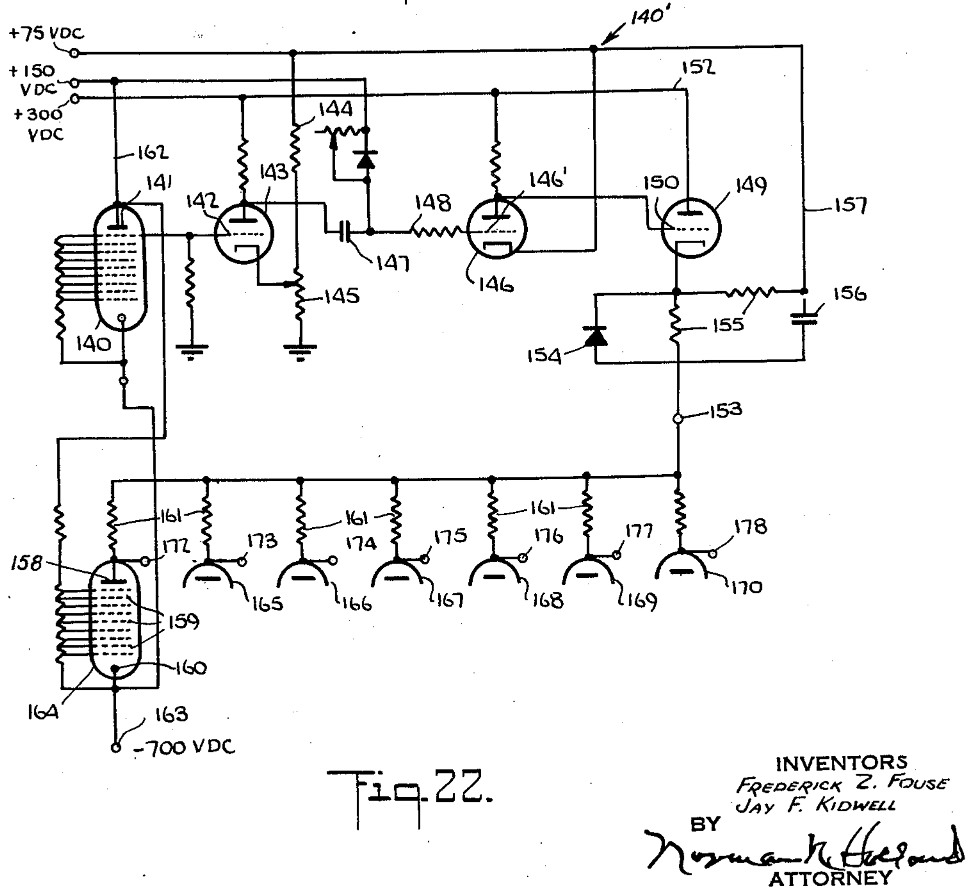
Figures 20, 21:
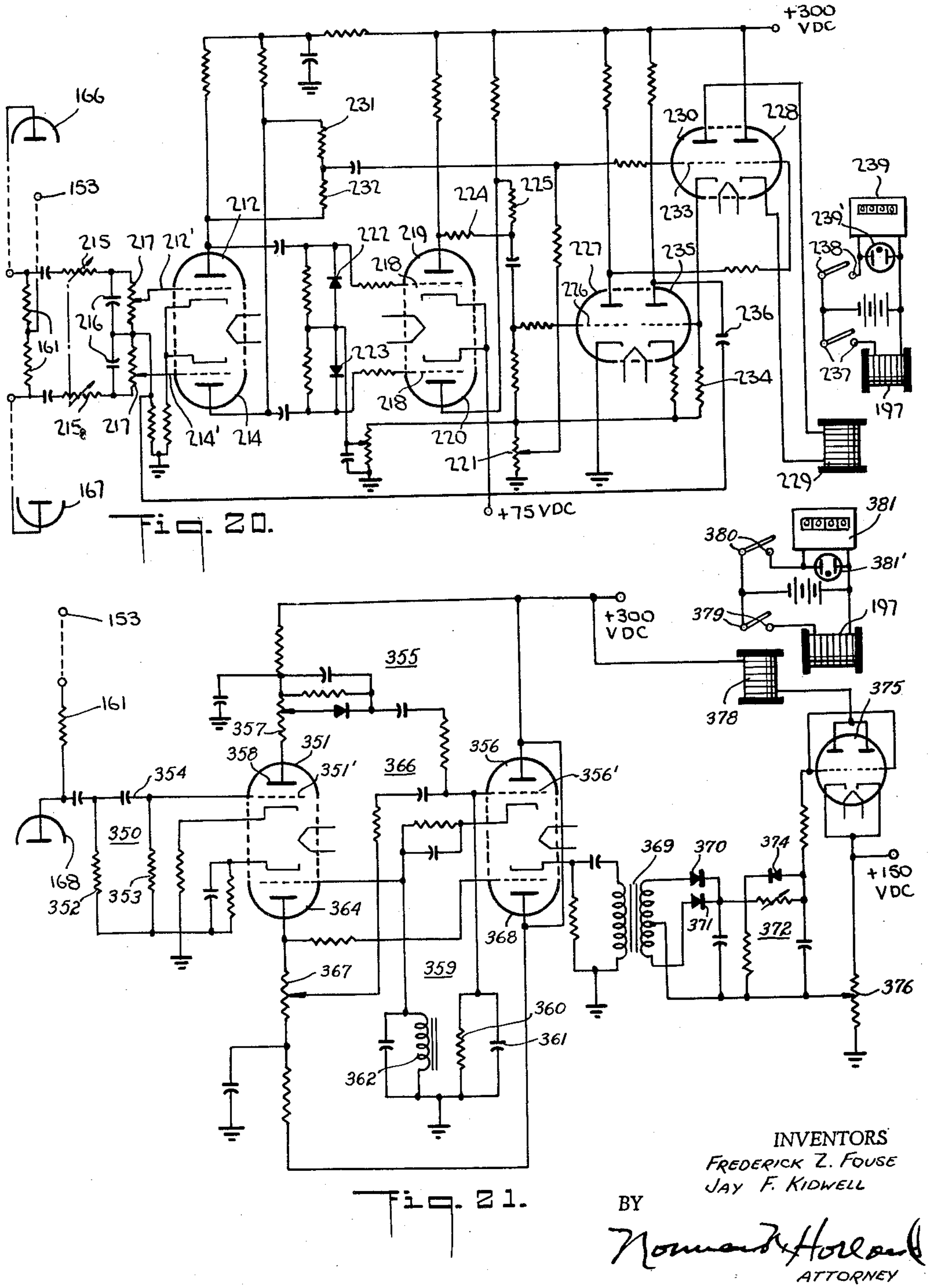

FIGS. 3, 4 and 5 are vertical sectional views taken along lines 3—3, 4—4 and 5—5, respectively, of FIG. 2;

FIGS. 6, 7, 8 and 9 are horizontal sectional views taken along lines 6—6, 7—7, 8—8 and 9—9, respectively, of FIG. 3;

FIG. 7*a* is an enlarged detailed view of the body inspection station;

FIG. 10 is a vertical sectional view taken along line 10—10 of FIG. 1;

FIG. 11 is an enlarged detailed vertical sectional view taken along line 11—11 of FIG. 2 of the light tubes at the finish inspection station;

FIG. 12 is a horizontal sectional view of the light tubes of FIG. 11;

FIG. 13 is a fragmentary top plan view of another embodiment of the inspection machine illustrating additional inspection stations;

FIG. 14 is a sectional view taken along line 14—14 of FIG. 13;

FIG. 15 is a sectional view taken along line 15—15 of FIG. 13;

FIG. 16 is a diagrammatic illustration of the flaw detection and recording systems of the automatic inspection machine;

FIG. 17 is a schematic diagram of a preferred embodiment of the finish and shoulder inspection station amplifier;

FIG. 18 is a schematic diagram of a preferred embodiment of the amplifier for the stone or blister detectors;

FIG. 19 is a schematic diagram of a preferred embodiment of the amplifier for the washboard detector;

FIG. 20 is a schematic diagram of a preferred embodiment of the amplifier for the vertical combustion mark detector;

FIG. 21 is a schematic diagram of a preferred embodiment of the amplifier for the lap detector; and FIG. 22 is a schematic diagram of a preferred embodiment of the enabling circuit.

The automatic selector will first be described generally with particular reference to FIGS. 1 and 2. The glass or other transparent containers 1, which are to be inspected by the automatic selector 2, are fed into the automatic selector 2 by an intake conveyor 4 as is illustrated at the upper left-hand corner of FIG. 1. The containers 1 are fed by the intake conveyor 4 into an intake star wheel 5 which is intermittently stepped to present the containers 1 periodically in spaced relationship to a transfer conveyor 6. The transfer conveyor 6 moves each container 1 into a finish inspection star wheel 7, which is being intermittently stepped in synchronism with the intake star wheel 5 to move each of the containers 1 to a finish inspection station indicated generally at 8. At the finish inspection station 8 light tubes are lowered into each of the containers 1 to inspect the sealing surfaces or finishes and shoulders of the containers 1 in cooperation with a light sensitive flaw detection circuit as the containers 1 are rotated at high speed. After the inspection of the containers 1 at the finish inspection station 8, the finish inspection star wheel 7 moves the containers 1 to the top of a vertical chute 9. Each of the containers 1 drops vertically downwardly through the vertical chute 9, and as it does so, it is engaged by the rollers 11. The rollers 11 are rotating at a high rate and are tilted slightly from the vertical so that they engage each container 1 and cause it to move downwardly with a simultaneous rotational motion. The body inspection station, which is indicated generally at 10, inspects the entire body of each of the containers 1 with one or more scanning light beams and cooperating light sensitive flaw detectors as the containers are spun down through the body inspection station 10. The lower end of the vertical chute 9 delivers each of the containers 1 to an outlet star wheel 12 (FIG. 8) which transfers each of the containers 1 to an outlet conveyor 14. When a defect has been sensed at either the finish inspection station 8 or the body inspection station 10 in any of the containers 1, these containers 1 are removed from the automatic selector 1 by a reject arm 15 as the containers 1 are moved by outlet star wheel 12 from the bottom of the vertical chute 9 to the outlet conveyor 14. This automatic rejection system, which will be more fully explained below, operates generally as follows.

A memory wheel 16 is provided on the automatic selector 2 and it is rotated in synchronism with the movement of the containers 1 through the automatic selector. One of a pluraltiy of movable memory wheel pins 17 corresponds to each container 1 as the container 1 is moved through the inspection machine. When a flaw is detected in the container 1 at either the finish inspection station 8 or the body inspection station 10, the memory wheel pin 17 corresponding to that particular container 1 is moved by the finish or body inspector flaw detectors to a reject position so that the pin 17 operates the reject arm 15 when the defective container 1 reaches the reject arm 15 at the outlet star wheel 12. Each memory wheel pin 17 corresponding to a container 1 in which no flaw has been detected remains in its normal position and these containers 1 therefore pass by the reject arm 15 to the outlet conveyor 14.

*The Mechanical Drive System*

In order to move the above-mentioned conveyor belts and star wheels as well as the other moving parts of the selector in synchronism, the preferred embodiment of the selector has its moving parts coupled to a single power source. In the preferred embodiment illustrated, this source comprises the electric drive motor 20. Drive motor 20 is coupled to a main horizontal drive shaft 21 through the intermediation of the drive belt 22 and pulleys 23 and 24. Each of the moving parts of the selector are driven by suitable connections to the main drive shaft 21 so that the main drive shaft 21 acts to synchronize the movements of the moving parts throughout the selector. The principal auxiliary drive shafts which are driven by the main drive shaft 21 comprise a vertical container spinner shaft 25, a vertical timer shaft 26, and a horizontal conveyor drive shaft 27. The connection between the main drive shaft 21 and these three auxiliary shafts are best illustrated in FIGS. 3, 5, 8, and 9. Thus, the main drive shaft 21 is coupled to the vertical container spinner shaft 25 by the spiral gears 28 and 29 (FIG. 9). The vertical container spinner shaft 25 drives the horizontal conveyor drive shaft 27 by means of spiral gears 30 and 31 (FIG. 3), and shaft 27 in turn drives the vertical timer shaft 26 by the spiral gears 32 and 33 (FIG. 5). It is thus apparent that an exact synchronism is obtained so that these three shafts turn at desired speed ratios with one another and with the main drive shaft 21 to accomplish the necessary container control movements which will now be more fully described.

In the following explanation for purposes of convenience, the operation of the machine will be described for an operating speed of sixty containers per minute and the movement of the parts of the selector will be described at particular speeds to describe their relationship with this operating speed. It is clear that the inspection machine itself may be run at appreciably higher or lower speeds as desired and that variations may be made in the rates of the various parts of the machine to accommodate a different over-all rate of operation or to permit obvious variations in the operating rate of particular portions of the machine as, for example, for different container sizes.

Figure 6:
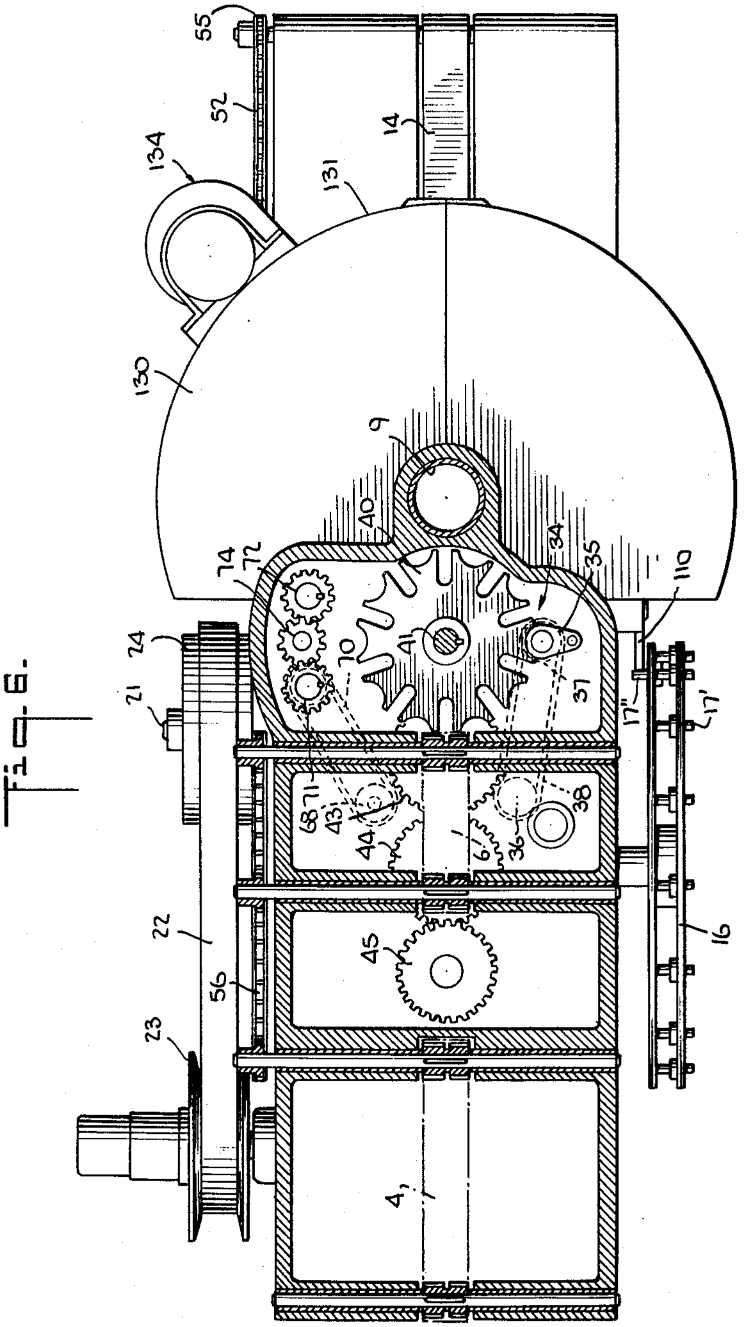

Using the operating rate of sixty containers a minute, a drive means is provided to index the intake star wheel 5, the finish inspection star wheel 7, and the outlet star wheel 12 intermittently at the rate of sixty steps per minute. The drive for the intake star wheel 5 and the finish inspection star wheel 7 is illustrated in FIGS. 5 and 6. Where the operating rate of the selector is sixty containers per minute, the vertical timer shaft 26 is most conveniently driven at the rate of sixty revolutions a minute by a suitable choice of the spiral gears 28–33. Intake star wheels 5 and finish inspection star wheel 7 are stepped at the rate of sixty steps per minute by being connected to the vertical timer shaft 26 through the intermediation of the Geneva movement 34 (FIGS. 5 and 10), whose drive crank 35 is rotated at sixty revolutions per minute through the intermediation of sprockets 36 and 37 and the coupling chain 38. The Geneva movement wheel 40 is mounted directly on the supporting shaft 41 of the inspection star wheel 7, and the intake star wheel 5 is stepped in synchronism therewith by the gear train 42–45 (FIG. 5). The outlet star wheel 12 is stepped in synchronism with the other star wheels 5 and 7 through the intermediation of a second Geneva movement 46 (FIGS. 5 and 9), whose crank 47 is also driven at sixty revolutions per minute from the vertical timer shaft 26 by the chain 48 and the sprockets 49 and 50. A synchronizing connector 49′ is provided on the timer shaft 26 to rotate the sprocket 49 thereon so that the movement of the outlet star wheel can be synchronized with the arrival of the containers at the bottom of the chute 9. The Geneva movement wheel 47′ is attached on the vertical outlet star wheel shaft 51.

Also mounted on the vertical timer shaft 26 are three actuator members 184, 185, and 186 for the proximity switches 184′, 185′, and 196′. These proximity switches are associated with certain of the container inspection circuits as will be more fully described below to open the container reject relay circuits between scanning operations.

The drive means for the transfer conveyor 6 and the outlet conveyor 14 comprises a chain 52 (FIG. 4) engaging a sprocket 53 on the horizontal conveyor drive shaft 27 and suitable sprockets 54 and 55 on the transfer conveyor 6 and the outlet conveyor 14, respectively. Another chain 56 couples the intake conveyor 14 with the transfer conveyor 6.

The moving portions of the finish inspection station 8, which cooperate with the finish inspection star wheel 7 and which are coupled to the drive system, comprise the two light tubes 57 and 58 which are each lowered into a container 1 during the inspection operation and turntables 59 and 60 (FIG. 4), one of which is located beneath each of the light tubes and which are adapted to rotate the containers 1 at high speed while their finishes are being inspected. The light tubes 57 and 58 are both mounted on a horizontal mounting arm 61 which intermittently lowers the light tubes 57 and 58 into containers 1 between the indexing movements of the finish inspection star wheel 7. This lowering of the light tubes 57 and 58 is synchronized with the indexing movement of the finish inspection star wheel 7 by the circular cam 63 (FIG. 1) which is mounted on the upper portion of the vertical timer shaft 26. A cam follower rod 64 has the mounting arm 61 attached at its upper, and it extends downwardly through a suitable bearing 65 to a cam roller 66 at its lower end which rides on the cam surface 67 of the cam 63. The vertical timer shaft 26 makes one revolution for each stepping movement of the finish inspector star wheel 7, and a suitably depressed portion 67′ is provided on the cam 67 to lower the light tubes 57 and 58 into adjacent containers 1 during the stationary period of the finish inspection star wheel 7 intermediate its stepping movements.

As illustrated in FIG. 4, the turntable 59 is driven from the vertical container spinner shaft 25 through the intermediation of the sprockets 68 and 69 and the connecting chain 70. Gear 71 on the turntable 59 is coupled to the gear 72 on the turntable 60 through the idler gear 74. The turntables 59 and 60 are continuously rotated so that the containers 1 are rotated about their vertical axes when the finish inspection star wheel 7 moves the containers 1 into their inspection position on the turntables 59 and 60. In the embodiment illustrated the turntables 59 and 60 are rotated at the speed of the vertical shaft 25 at about nine hundred revolutions per minute to assure several complete turns of each container during the fraction of a second that it is positioned on the turntables.

In order to provide for a downwardly rotational motion for the containers 1 to permit scanning of the entire body surface of the containers 1 as they pass down the vertical chute 9 through the body inspection station 10, three rubber rollers 11 (FIGS. 3 and 7) are mounted at the edges of the vertical chute 9 to engage and spin the containers 1. Each of the rollers 11 is mounted on a suitable shaft 75, which has its upper and lower ends mounted in bearings 76 and 77, respectively. In order to give the container 1 a simultaneous downward and rotational motion, each of these rollers is tilted from the vertical a precise amount in accordance with the relative amounts of downward and rotational motion required. Obviously, as the angle of tilt is increased, the distance which a container 1 is moved downwardly during each revolution of the rollers 11 is increased. The rollers 11 are preferably driven at a high speed such as about ten thousand revolutions per minute and the containers themselves which are normally large than the rollers rotate at a somewhat lower rate. In order to provide for a relatively slow downward rate in comparison to the rotational rate of the container 1, the angle of the rollers 11 is set at a fraction of a degree from the vertical so that each container moves downwardly about one inch for each twenty revolutions. The downward speed is adjusted by changing the angle of the rollers.

The rollers 11 are driven by a hollow sleeve 80 which is rotatably mounted concentrically of the vertical chute 9 on the bearing 81 so that the teeth 82 of the ring gear 83 engage the gear 83' on shaft 75 of each of the rollers 11. The hollow sleeve 80 is driven from the main drive shaft 21 through a vertical idler shaft 84 (FIG. 5) which is connected to the main drive shaft 21 by spiral gears 85 and 86 and which is connected to the ring gear 87 on the hollow sleeve 80 by gear 88.

The memory wheel 16 whose operation will be more fully described below is mounted on a horizontal shaft 89 and is driven from the timer shaft 26 by worm gears 89' and 89'' (FIG. 5).

*The Finish and Shoulder Inspection Station*

As described above in connection with the description of the mechanical drive system, the containers 1 are each moved successively by the finish inspection star wheel 7 to two finish inspection positions 90 and 91 at the light tubes 57 and 58, respectively. In order to isolate the containers from outside light sources, the pockets 7' in the finish inspection star wheel 7 are relatively deep and they cooperate with the side walls 7'' and the cover 7''' to isolate the containers 1. At the finish inspection position 90, one container 1 is rotated in a clockwise direction by turntable 59 (FIG. 4), and at the finish inspection position 91, the preceding container 1 is rotated in the same direction by turntable 60. The inspection of the finishes of the containers 1 will now be described in greater detail with particular reference to FIGS. 1, 2, 11, and 12.

The portions of the container 1 inspected at the finish inspection stations comprise the rim of the container including the portion of the outer rim which engages a container closure and which is known as the container finish as is indicated at 92 in FIG. 11 and the shoulder 92' of the container. Occasionally in the manufacture or the handling of glass containers, defects such as cracks or checks occur at the rims or shoulders of the containers 1 and it is necessary to detect and reject these defective containers. The checks or cracks are very often oriented so that they run about radially of the container; however, in some instances the checks or cracks may be positioned at a considerable angle in either direction from a radius of the container. In order to detect all of these defects no matter how they are positioned, the preferred embodiment of the inspector illustrated uses two inspection positions at the inspection station 8 which are substantially identical except for the angular arrangement of the inspecting light beams and the photoelectric cells. Accordingly, the first finish inspection position 90 will first be described in detail, and the differences in the second finish inspection position 91 will then be described which cause it to detect flaws which have escaped detection at finish inspection position 90.

The light tube 57, which is shown in detail in FIGS. 11 and 12, is mounted on the support arm 61 which lowers it through aperture 57' in cover 7''' into each container 1 when the container 1 is presented to the finish inspection position 90 by the intermittent movement of the finish inspection star wheel 7. The light tube 57 is held steady during its movement by the stationary guide rods 62 and 62' which slidably engage bearings 61' and 61'' on the support arm 61. The light tube 57 comprises a lamp or other light source 93 mounted in the upper portion of a hollow tube 94 and suitable lens 94' which directs the rays from the source 93 against a reflector means mounted on the lower portion of the tube 94, which includes a first mirror 95 which reflects the light beam 96 as generally horizontal light beam 97 and a second mirror 98 which reflects the light beam 97 as light beam 99 at an acute angle to the container radius. Light beam 99 is therefore directed at an angle, as seen in FIG. 12, to strike cracks or defects 101 in the container rim 100 which are oriented so that they present themselves to the light beam 99 at an angle. The light beam 99 will be reflected from defect 101 as light beam 102 towards the photo-electric cell 104. The photoelectric cell 104 is connected to a suitable amplifier 105 (FIG. 16) which amplifies the signal resulting from the energizing of the photo cell 104 and which energizes a memory wheel pin relay 106 so that the pivotally mounted arm 107 will strike a memory wheel pin 17 on the memory wheel to move it to its reject position.

The finish inspection position 91 differs from finish inspection position 90, as shown in FIG. 12, by having its light beams directed in an opposite sense so that checks or cracks 101' are detected which might have escaped detection in the finish inspection position 90 due to their being oriented in a direction generally parallel to the light beam 99. Thus, at finish inspection station position 91 the lamp 93' (FIG. 16) has its light beam 96' successively reflected by mirrors 95' and 98' as light beams 97' and 99' and by check 101' towards the photoelectric cell 104' as beam 102'. When a crack or check 101' is detected at finish inspection position 91, the amplifier 105' energizes the relay 106' so that arm 107' moves a memory wheel pin 17 to its reject position. The contacts 184'' of the proximity switch 184' connect the memory wheel pin relays 106 and 106' to the amplifiers 105 and 105' only during the interval when the light tubes 57 and 58 are lowered within the containers 1 in their inspecting positions.

Figure 8:
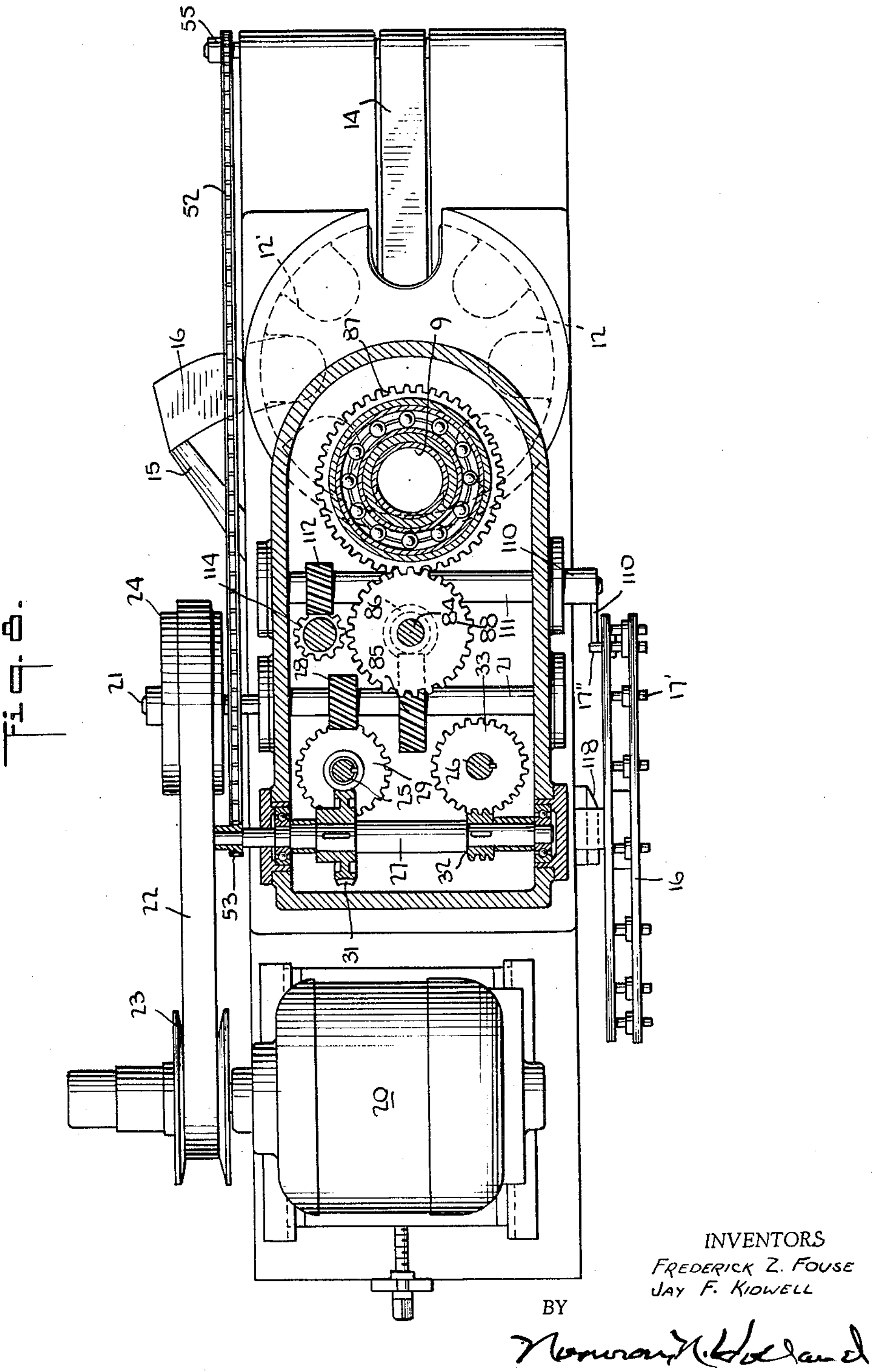
Figure 8:
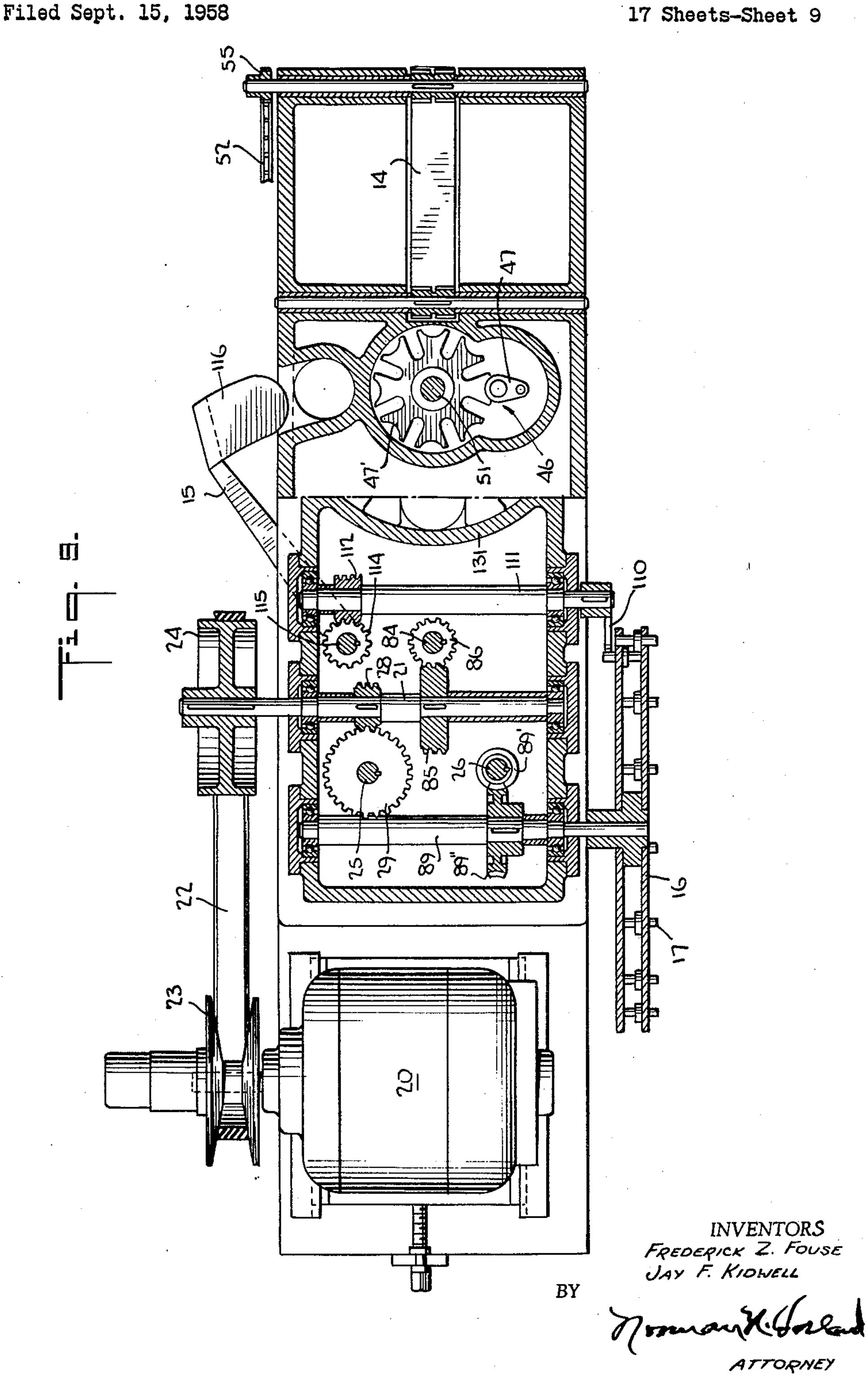

The operation of the memory wheel 16 and its cooperation with the finish inspection positions 90 and 91 will now be described. The memory wheel 16, as described more fully above, is rotated in synchronism with the container positioning star wheels 5, 7, and 12 of the inspection machine 2. The memory wheel 16 illustrated in FIG. 1 has fifteen memory wheel pins 17 equally spaced around its outer edge so that one of these pins corresponds to the position of each of fifteen containers which are being moved through the automatic inspection machine at any given instant. Each memory wheel pin 17 is slidably mounted on memory wheel 16 for movement between an outer position as illustrated in FIG. 8 by pin 17′ and an inner or reject position as illustrated by pin 17″. Since the particular inspection machine being described is inspecting sixty containers per minute, the memory wheel shaft is driven at the rate of four revolutions per minute by a suitable selection of the worm gears 89′ and 89″. Each of the memory wheel pins 17 is positioned to correspond to a position of one container 1 in the automatic selector and the arms 107 and 107′ are mounted so that the adjustable contact pads 108 and 108′ on their upper ends 109 and 109′ strike the memory wheel pins 17 corresponding to the containers 1 which are positioned in finish inspection positions 90 and 91, respectively. Thus, if a defect is detected in the finish of the container 1 at either finish inspection 90 or 91, the memory wheel pin 17 corresponding to that container 1 will be moved to its inward or reject position. By the time this defective container 1 has been advanced through the automatic inspection machine to the reject position adjacent the reject arm 15 in the outlet star wheel 12, the corresponding memory wheel pin 17 will have rotated to a position adjacent to the reject lever contact arm 110. The reject lever contact arm 110 is attached to the end of a horizontal reject shaft 111 as illustrated in FIGS. 9 and 10. The clockwise rotation of the memory wheel 16 causes an inwardly depressed memory wheel pin 17″ to rotate the reject contact arm 110 in a counterclockwise direction and this motion is transferred to the reject arm 15 through the intermediation of the horizontal reject arm shaft 111, spiral gears 112 and 114 (FIG. 9), and the vertical reject lever shaft 115. As seen in FIG. 9, the vertical reject lever shaft 115 is rotated in a counterclockwise direction so that the container support plate 116 on the end of the reject arm 15 swings outwardly from the outlet star wheel 12, thereby removing the container 1 from the container outlet star wheel 12 and allowing it to be deflected into a suitable reject chute or conveyor, not shown. The reject arm 15 is returned to its normal inward position as the memory pin 17 is moved clear of the reject lever control arm 110 by the spring 117 which is connected to a suitable crank member 117′ on the top of the vertical reject lever shaft 115. Additional rotation of the memory wheel 16 moves the depressed memory wheel pins 17″ against a cam 118 (FIG. 8) which slides each of the pins 17″ to its outward or non-reject position as indicated at 17′.

A preferred embodiment of the amplifier 105 is illustrated in FIG. 17.

The presence of a defect in the container finish or shoulder causes a reflection of the light rays 99, 102 onto the photoelectric cell 104. The anode 104″ of the photo cell 104 is connected to terminal 250 of the amplifier and through dropping resistors 251 and 252 to one terminal of a 75 volt D.C. source.

The cathode 104‴ of the photo tube 104 is connected to input terminal 254 of the amplifier 105. The signal voltage is developed across shunting resistor 255 which has one end connected to terminal 254 and its opposite end connected to the other terminal of the 75 volt source which is at ground potential. The coupling capacitor 253 connects the input to the input grid 256 of a pentode first stage amplifier 260. The grid 256 of this stage is shunted by a variable resistor 258. By adjusting the values of resistor 258 and capacitor 253 a tuned pass circuit is developed which provides high frequency attenuation at the input of the first stage.

The light sources for the photoelectric cells are preferably powered by a filtered D.C. potential so that there is no modulation of the fault signal picked up by the photoelectric cell 104. However, irregularities in the surface of the glass do cause low level random frequency signals to appear across the coupling capacitor 253 and the tuned pass circuit 253, 258 filters this signal out.

The amplifier 105, since it need be responsive only to very low frequency fault rates is D.C. coupled through the first three stages 260, 261 and 262 with the first stage 260 being starved. By lowering the screen voltage of pentodes below 10% of their plate supply voltage and increasing the resistance of their plate load 10 or more times beyond conventional practice the amplification factor of such starved tubes is greatly increased in spite of a decrease of their mutual transconductance. By incorporating the principle of starvation in a direct coupled amplifier, a drastic increase in over all gain is achieved and the amplifier is enabled to handle heavy negative feed back in the order of 1000/1 to reduce hum and tube noise to extremely low levels. Also high power gains and high stability are obtained with no oscillating at feed back ratios of up to 3000/1. Improved low frequency response is also obtained.

The second and third stages 261 and 262 of the amplifier 105 are not starved but act as standard D.C. coupled voltage amplifiers. The input stage 260 is starved and has a gain of 1000 or more. The second and third stages have a gain of approximately 100 each bringing the total gain of the three D.C. coupled stages to something over 1,000,000.

Positive feed back to the first stage 260 is taken from the screen grid 257 of tube 261 through resistors 264 and 265 and decoupling capacitor 266. Capacitor 266 is used primarily as a transient bypass.

A negative feed back is provided from resistor 268 of the cathode bias network of tube 262 to the cathode resistor 269 of tube 260 through resistor 270. The degenerative bypass capacitor 271′ in this case being very large such as 100 mfd.

The fourth stage amplifier tube 271 has high current gain and is biased for cut off by a 75 volt D.C. bias on the cathodes 272 of tube 271. Grid bias for the tube 271 is developed across resistor 274 and it is adjustable for threshold clamping by being adjustably tapped onto cathode resistor 275.

Pulse duration is determined by the time constant of the RC coupling 274, 276.

A relay holding and surge absorption circuit consisting of capacitor 277, resistor 278 and diode 279 connected in shunt across relay coil 280 provides the necessary $\frac{1}{20}$ second relay hold-in time to insure proper functioning of the arming solenoid 106 when contacts 280′ close. Since the tube 221 is normally held in cut off condition, no plate current is drawn until the tube 271 is fired. Initially on firing, the plate voltage of tube 271 will drop creating a potential difference between the B+ and the plates 281 of tube 271 through resistors 278 and capacitor 277. Capacitor 277 discharges through resistor 278 maintaining current on relay coil 280 after tube 271 has ceased conducting. Reverse current set up by the collapsing field of the relay coil 280 are absorbed by the surge absorption network 277–279. Contacts 280″ on the relay coil 280 operate the counter 281 and the indicator lamp 282 to provide a record and a visual indicator of the detection of a fault in the container finish or shoulder.

*The Body Inspection Station*

After the inspection of the container finishes and shoulders at the finish inspection station 8, the containers 1 are stepped by the finish inspection star wheel 7 to the top of the verical body inspection chute 9. Each container 1 then drops downwardly through the chute 9 until it reaches the inclined rollers 11 adjacent to the body inspection station 10. As described more fully above in connection with the inspection machine drive means, the axes of the rollers 11 have a slight tilt from the vertical so that after they engage each of the containers 1, the container 1 is moved downwardly with a motion having a predetermined rotational speed and downward speed which is determined by a suitable choice of the roller speed, diameter, and degree of tilt.

The body inspection station 10 is best illustrated in FIGS. 3, 7 and 7*a*. The inspection of each container 1, as will be described more fully below, is accomplished by directing one or more beams of light onto the container 1 wall as the container 1 is rotated downwardly by the rollers 11 past suitably positioned photoelectric cells so that defects in the containers 1 cause reflections or diversions of the light beams into the photoelectric cells. In order to eliminate any interference from outside light sources a suitable shield is provided which surrounds the vertical chute 9, the rollers 11, the light sources, and the photoelectric tubes. As seen in FIGS. 3 and 7, this shield comprises top wall 130, curved side walls 131 and a suitable bottom plate 132. To keep the body inspection station 10 at a satisfactory operating temperature an air blower system 134 is provided (FIG. 7). In order to permit the desired light scanning beams to strike the side walls of the container 1 in the chute 9, an aperture 135 is provided in the vertical chute 9 at the body inspection station 10.

Five distinct types of imperfections are among those likely to occur in manufacture and the selector is designed to detect each of these and to distinguish between them. These are referred to as stones, blisters, laps, vertical marks, and washboards. These will now be briefly described and in the following description reference to an imperfection by one of the above names is to be interpreted in the light of this description.

A stone is a small bit of opaque material, generally grey or white unfused silica, embedded in the glass, generally near the surface. Usually the glass immediately around the stone will be lenticular.

A blister is an air bubble in the glass. A blister may be either closed and generally completely surrounded by glass, or it may be open, i.e. communicating with the atmosphere either within or without the jar.

A lap is a single circumferential crease of varying length on the outside of the jar. It is caused by a fold or lap in the slug of molten glass which occurs as the glass fills the mold.

A vertical mark is a single line on the outside of the jar similar in appearance to a lap or elongated open blister except that its direction is substantially axial rather than circumferential.

A washboard is an area on the outside of the glass comprising several closely spaced circumferential wrinkles. In some respects it may be considered as a multiple lap.

The apparatus to be described preferably uses light-beams and photo-electric cells having a sensitive area of about ¼ x 1" which may be modified by the use of apertures to restrict the light actuating the photo-electric cell. Reflection, deflection, or scattering of a light beam occurs when a flaw is introduced into the path. The manner or degree of deflection depends upon the type of flaw. In this apparatus one or more photo-electric cells is positioned to detect with greatest sensitivity each type of flaw. Light incident on a particular photoelectric cell resulting from the passage through the beam of a marginal flaw of one type is substantially greater than that resulting from any of the remaining four types. The output of the photoelectric cells is fed into suitable electronic circuitry, different for each type of flaw, which actuates the rejection mechanism on the basis of the nature of the photoelectric cell output. The acceptable magnitudes of the four types are considerably different, so that, for example, the apparatus must reject jars for very small stones but not for comparatively large blisters. By the proper choice of circuit constants and adjustment of amplifier gain the size of the smallest detectable flaw can be modified as desired.

Except for washboards which may cover a large area, the flaws are generally very small, in the order of 1/32" in diameter or width. To get the maximum effect, the cross section of the light beam used for detecting the remaining four types is as small as is permitted by other considerations described below.

To insure that every defect is disclosed, the above described container motion is used so that the beam is made to fall sequentially on each unit of area of the entire cylindrical surface of the jar.

FIGS. 7, 7*a* and 16 show preferred arrangement of the optical components for the inspection system.

A visible light source 136 is provided which is preferably a zirconium arc. This has the desired combination of high intensity and small source area. Suitable lenses, apertures, and masks serve to limit the cross section of the light beam 138 to a rectangle of about .10 inch parallel to the axis of the jar by .03 inch. The beam 138 is projected horizontally to intersect the vertical axis of the jar so that the entire surface is scanned with some overlap.

In this apparatus it has been found possible to use a single light source of the type just described for the detection of four types of flaws, viz. stones, blisters, laps, and vertical marks. By positioning the detector photoelectric cells as shown in FIGS. 7, 7*a* and 16 there is a minimum of interference. An alternate arrangement is to use individual light sources for each detector.

For the detection of washboards a separate light source is preferably employed. For reasons to be described later, best results are secured, in the case of the example illustrated in the drawing, when this source emits principally short wave ultraviolet light. This source is shown at 137 emitting a light beam 139.

*Enable Circuit*

In order to prevent spurious signals from being generated in the periods between the passage of a container 1 past the rollers 11, it is desirable to activate the body inspection elements only during the period when a container is in engagement with the rollers 11. A preferred embodiment of an enable circuit which activates the inspection elements during the passage of a container will now be described.

The visible light beam 138 from the source 136 is reflected directly back upon the incident beam by the vertical sidewalls of a container 1. A reflector 138' (FIG. 16) is positioned in the path of the reflected beam to reflect it toward a photoelectric cell 140 so that the photoelectric cell 140 is activated by the presence of a container 1 in the rollers 11.

The output of the photoelectric cell 140 is applied to an enable amplifier 140' shown in FIG. 22. A current signal from the enable photoelectric cell 140 is taken from its last dynode 141 and applied to the control grid 142 of one half of a type 12AT7 tube 143, normally biased below cutoff by a voltage divider comprising a resistor 144 and a potentiometer 145. The signal causes stage 143 to conduct and drives the control grid 146' of one half 146 of a type 12AT7 tube negative. Stages 143 and 146 are coupled through a condenser 147 and resistor 148 whose values are such as to hold the control grid of stage 146 negative for the approximately 1 second period required to scan the entire vertical jar wall. The following stage 149, one half a type 12AT7 tube, is normally cut off by conduction of stage 146, and when stage 146 is cut off, the voltage at the control grid 150 of stage 149 rises abruptly causing stage 149 to reach maximum conduction. Stage 149 is in series with the positive voltage terminal 152 and a plate supply terminal 153 for each of the other photoelectric cells shown. A filter in the cathode circuit of stage 149 comprises a diode 154, two resistors 155 and a capacitor 156. An abrupt increase in conduction of stage 149 is filtered by the cathode circuit so as to prevent application to the other photoelectric cells of a spurious signal which the other photoelectric cells might detect as a flaw. A positive 75 volt supply 157 is connected to each of the other photoelectric cell anodes through the filter circuit.

The flaw detecting photoelectric cells shown in FIG. 22, are preferably type 931A commercially available from the Radio Corporation of America, of New York, New York, having an anode 158, nine dynodes 159 and a cathode 160. The anode voltage controlled by the enable circuit of FIG. 22 is applied in each case through a resistor 161. A conventional voltage divider connected to the 150 volt positive supply 162 supplies stepped voltages to the dynodes. Each cathode is connected to a 700 volt negative supply 163. The photoelectric cells 164–170 have output terminals 172–178 respectively.

From the foregoing description, it is apparent that the several photoelectric cells can apply no signal to their respective output terminals unless the vertical wall of the jar has activated the enable circuit and caused it to supply anode voltage to the anodes of the flaw-detecting photoelectric cells.

*Stone Detection*

The lenticular area caused by an embedded stone in a container 1 causes reflection of the incident light beam 138 on a wide angle including the path 180 (FIG. 16) leading to the stone-detecting photoelectric cell 164. The photoelectric cell 164 is enclosed in a housing 181 on the chassis 182. The housing carries a short barrel 183 extending from the photo electric cell 164 and terminating in a member 183' forming an aperture 183'' about 5/32'' in diameter (FIG. 16). The axis of the barrel 183 is on the path 180 at an angle of about 40° to the incident light beam 138 from light source 136, and the aperture is disposed close (about one-half inch) to the container 1, the photocathode of the photoelectric cell 164 being about 1½ inches from the jar. While other defects will cause some reflection, it will not be so intense at angles such as that of the path 180. Substantial reflection from parts of the jar other than the spot being scanned is avoided by the location of the small aperture 183'' close to the jar.

When the incident beam 138 strikes a stone, a short flash of light is reflected on the photoelectric cell 164 whose associated circuit is shown in FIG. 18. Momentary conduction of the photoelectric cell 164 applies a short negative pulse through its output terminal 172 to the first stage 187 of a conventional two-stage, resistance-capacitance coupled amplifier 188. The first and second stages 187 and 189 each comprise one half a type 12AT7 tube. Stage 187 is normally conducting and stage 189 is normally cut off by grid leak bias. The negative pulse initiated by a flaw is applied to the control grid 190 of stage 187 to cut off the first stage, which then applies a positive pulse to the control grid 191 of the second stage 189 causing it to conduct. On conduction, a negative swing of voltage at the anode 192 of stage 189 is coupled through a capacitor 193 to the control grid 190 of the first stage 187 thereby lengthening the time which stage 187 is cut off and stage 189 conducts to about ⅕ second. In series with the second stage 189 is a relay 195 which is held energized for this time. The relay contacts 196 complete the circuit through the memory wheel solenoid 197 to move the arm 198 in the same manner as described above for the finish inspection to move a memory wheel pin 17 to its reject position. Relay contacts 199 close the counts circuit to operate counter 200 to provide a count of the number of containers 1 having stones. An indicator lamp 200'' is connected across the counter 200 to provide a visual indication of the detection of a defective container by the stone detector.

*Blister Detection*

As shown in FIGS. 7, 7*a* and 16 the photoelectric cell 165 for detecting blisters is located to one side and above a projection of the incident beam 138. In this position, the photoelectric cell is within the cone of intense light refracted forwardly by the lens effect of a small air bubble defect. As previously mentioned, a stone primarily reflects while a horizontal lap, vertical line or washboard primarily refract in a relatively narrow horizontal or vertical zone. Thus, the path 201 on which the beam is refracted by a blister lies outside the refraction paths of the vertical and horizontal defects, and path 201 receives very little light by refraction from a stone or from minor defects.

As in the case of a stone, a blister directs a momentary flash of light on the blister-detecting photoelectric cell 165 causing it to conduct momentarily. Associated with the photoelectric cell 165 is an amplifier circuit 202 like that of FIG. 18. Again a short pulse is amplified and stretched to hold a control relay 203 energized for approximately ⅕ second and apply a signal to the memory wheel solenoid 197 and to counter 204 and lamp 205.

*Horizontal Lap Detection*

As shown in FIGS. 7*a* and 16 a horizontal lap primarily refracts the incident beam 138 both upwardly and downwardly in a vertical zone with relatively little horizontal spread and is best detected by two vertically spaced photoelectric cells 166 and 167. The photoelectric cells lie on two folded paths 210 which originate within the vertical zone and which are bent up and down by parabolic mirror surfaces 211. The mirror surfaces are masked from light deflected by other flaws by a plate 213. The plate 213 has two vertically spaced apertures 213' lying on the paths 210 and passing primarily only light deflected by a horizontal lap, so that the vertically deflected beams will strike both of the lap-detecting cells 166 and 167. The lap photoelectric cells 166 and 167 are connected to an amplifier 166' shown in FIG. 20. The circuit requires that each photoelectric cell must receive light above a certain intensity and that the sum or average of the two must exceed a predetermined minimum before the circuit will cause a rejection of the jar under test.

The respective lap photoelectric cells 166 and 167, when caused to conduct by a light pulse, apply negative pulses to the control grids 212' and 214' of amplifier stages 212 and 214, each one half a type 6SN7 tube. The pulses are integrated by RC networks 215, 216 and discriminate between long laps and short laps, rejecting the latter. The stages 212 and 214 are adjusted for normal conduction at the same level by potentiometer 217. When cut off by the long lap pulse, they apply a positive voltage to the controls grids 218 of stages 219 and 220, each comprising one half a 6SL7 tube normally biased below cutoff by a cathode biasing, potentiometer 221, by means of which the threshold may be adjusted. Diodes 222 and 223 serve as D.C. restorers for the bias circuit.

The two negative outputs at the anodes of the stages 219 and 220 are averaged by resistors 224 and 225 and the resultant mean pulse applied to the control grid 226 of stage 227, one half a type 6SL7 tube normally conducting at saturation. The circuit constants are such that this stage will not operate below cutoff unless both of stages 219 and 220 are conducting. If stage 227 is cut off, a subsequent stage 228 is allowed to conduct.

Stage 228 is in series with a control relay 229 and a stage 230 and both 228 and 230 being one half of type 12AT7 tube. Both halves must conduct to energize the relay. The second half 230 is caused to conduct by cutoff of the input stages 212 and 214. The resultant positive swing at the anodes of stages 212 and 214, is applied through averaging resistors 231 and 232 and the combined signal applied to the control grid 233 of stage 230.

When both stages 228 and 230 are conducting, current in the cathode resistor 234 of stage 230 causes a negative voltage swing at the cathode of a feed-back stage 235, increasing its conduction and applying a negative feed-back pulse through capacitor 236 to the grids of the input stages 212 and 214. The time delay involved in this feed-back holds the relay 229 energized for approximately ⅙ second. The relay contacts 237 energize the memory wheel solenoid 197 to operate the reject arm 198 in the same manner as the stone detector. Relay contacts 238 operate a lap fault counter 239 and an indicator lamp 239'.

*Vertical Line Detection*

Vertical lines or marks are detected by the apparatus and circuit shown in FIGS. 7, 7*a* and 16. The incident beam 138 is spread by the mark primarily in a horizontal zone with a vertical width so small that appreciable light from the mark does not extend upwardly to the apertures which admit light from a horizontal lap. However, the horizontal spread of the zone is sufficient so that paths 240 pass to either side of the narrow mask 213. Beyond the mask 213 are reflectors 241 and 242 converging on an aperture 243 in an upright plate 244. These reflectors bend the light paths 240 so that they pass through the aperture 243 to the vertical mark-detecting photoelectric cell 168. Only light momentarily deflected right or left causes the photoelectric cell to conduct.

The associated circuit 168' is shown in FIG. 21. The negative pulse at the anode of the photoelectric cell 168 is applied through a resistor-capacitor network 350 to the grid 351' of an input stage 351, one half of a type 6SL7 tube, normally conducting as a conventional linear amplifier. The network 350 resistors 352 and 353 and capacitor 354 filters out low frequency signals such as might be caused by ordinary variations in thickness of the jar wall. The network passes pulses of short rise time such as are caused by the momentary refraction of a vertical mark.

The amplified output of the input stage 351 is coupled through a tuned circuit 355 which serves to accentuate the rotational frequency of the jar and hence of the vertical mark pulses. The network thus discriminates against similar pulses caused by the two vertical mold marks, which pulses occur at twice the frequency of the vertical mark pulses. Further, the tuned network accentuates the amplitude sharpness of the mark pulses so that the out of phase mold pulses are subtractive rather than spuriously additive.

The sharpened negative pulse is applied to the grid 356' of the second stage 356, one half a type 6SN7 tube. The second stage 356 is a linear amplifier whose sensitivety is adjusted by a potentiometer 357 at the anode 358 of stage 351. A resonant circuit 359 in the cathode of stage 356 comprises a resistor 360, capacitor 361 and an inductance 362. The resonant circuit 359 is tuned to the frequency of the mark pulses and further filters and amplifies this component of the signal amplified by stage 356. The third stage 364, one half a 6SL7, amplifies linearly the filtered signal and applies positive feed-back to the grid 356' of the preceding stage 356 through a feed-back loop 366. The level of feed-back may be adjusted by a potentiometer 367 in the anode circuit of stage 364. The positive feed-back stretches the pulses and increases the selectivity of the resonant circuit 359.

The pulse signal is also applied from the anode of stage 364 to a coventional linear amplifier 368. The cathode output of stage 368 is applied through a pulse transformer 369 to full wave rectifiers 370 and 371. The rectified pulse signal is integrated in a network 372 including a diode 374. The network 372 integrates the resulting positive pulse series so as to discriminate against short series of pulses representing a short and harmless vertical mark. The diode 374 removes any negative swing of the resultant long positive pulse which is applied to the grid of the final stage 375. The final stage, a type 6SL7 tube, is biased below cutoff by a potentiometer 376 in the cathode circuit, and conducts only on a positive pulse passed by the netwcrk 372. Thus, only a vertical mark of substantial length can trigger the final stage and energize the control relay 378. Control relay contacts 379 energize the memory wheel solenoid 197 and contacts 380 operate the vertical mark fault counter 381 and indicator lamp 381'.

*Washboard Detection*

A washboard comprising a series of parallel horizontal lenticules scatters light in a vertical zone similarly as does a single horizontal lap, but differs in that the scattering occurs in a number of successive revolutions of the jar.

Preferably, a separate source 137 of ultra violet light directs a scanning beam 139 on the container 1. As in the case of a horizontal lap, two paths 282' define the angle within which the washboard reflects light both upwardly and downwardly. The paths 282 pass through a filter which transmits substantially only ultra violet light thus rejecting light reflected from inside the jar or from beams deflected from other flaws or irregularities.

As shown in FIGS. 7, 7*a* and 16 the washboard-detecting photoelectric cells 169 and 170 are mounted one above the other in a housing 283. Opposite the container 1 is a frame 284 holding the filter 284'. Within the housing and between the photoelectric cells is a block 285 having parabolic reflecting surfaces 286. A beam on one of the general paths 282 is reflected upwardly to photoelectric cell 169 and the other downwardly to photoelectric cell 170.

The washboard detection circuit 171 of FIG. 19, like the lap circuit of FIG. 21 operates to reject a container 1 only when both photoelectric cells conduct during several revolutions, that is, when the area of the washboard is substantial.

The first two 6SL7 stages 287, 288, and 289, 290 of the washboard amplifier are identical with those of the flaw detector of FIG 20. The two photoelectric cell signals applied to the input stages are integrated and amplified, and the output of both the first and second stages are averaged. The negative averaged output of the second stage 289, 290 is applied to a normally conducting third stage 291, one half a type 12AT7 tube 292, causing this stage to be cut off and to apply a positive pulse to the grid 293 of the subsequent stage 294, one half a type 12AT7 tube 295. This stage 294 is in series with a like stage 296 and the primary 297 of a pulse transformer 298. When both normally cutoff series stages 294 and 296 conduct, voltage developed across resistor 299 at the cathode 300 of stage 296 is applied to the primary 297.

The series stage 296 is caused to conduct by the positive, averaged output of the first stage 287, 288. With both tubes conducting for the length of time to scan a sizable washboard, a long positive pulse is coupled through the transformer 298 to full-wave rectifying and integrating circuits 301 like those described as to FIG. 21. The final normally cutoff stage 302, one half a 12AT7, supplies current to the control relay 304, whose switching contacts 305 are in parallel with all of the previously described relay contacts, to energize the memory wheel solenoid 197. Contacts 306 operate the washboard fault counter 307 and indicator lamp 308.

*Container Gauging and Spike Detection*

Another embodiment of the automatic inspection machine is illustrated in FIGS. 13, 14 and 15. In this embodiment two additional inspection stations are illustrated, one or both of which may be used with the above-described machine to check additional portions of the containers 1.

The first of these additional inspection stations comprises a container gauging station 400 which checks the diameter of each container and which rejects containers whose side walls are oversized or undersized. When the container 1 gauging station 400 is used, the intake star wheel 5″ is modified from the previously described intake star wheel 5 by the provision of a series of rollers 401 mounted at the side and at the back of the pockets 402 which rotatably engage the containers 1 in the pockets. At the container gauging station 400, the container 1 is rotated at a relatively high speed such as about two hundred revolutions per minute by a drive wheel 404. The shaft 405 of the drive wheel 404 is pivotally mounted on arm 407 at 407′, and the drive wheel 404 is urged into rotating contact with the container 1 by a spring 408. The drive wheel 404 is continuously rotated by being connected to the vertical container spinner shaft 25 through the intermediation of sprockets 409, 410, and 411 and chains 412 and 413. Thus, as container 1 is stepped by the intake star wheel 5″ to the container gauging station 400, the resilient rings 414 on the drive wheel 404 engage the container 1 and rotate it on the individual container support rollers 401. As the container 1 rotates, the gauging roller 415 on the inner end of a slidably mounted gauging rod 416 in accordance with the container diameter. Suitably positioned electrical contacts 417 and 418, respectively, are positioned on the container gauging rod 416 and these are adjusted to energize a container gauging reject relay 419 through contact 420 if the container 1 has either a too large or a too small diameter, respectively. The relay 419 operates a suitable reject arm 419″ to move a memory wheel pin 17 to its reject position. The relay 419 may also be connected through contacts 185″ of the proximity switch 185′ so that the container gauging rod is only effective at the time when the intake star wheel 5′ is between its stepping motions and when a container 1 is being rotated by the drive wheel 404. Other surfaces of the containers may be gauged by suitably positioned rods similar to rod 416.

The second additional and optional inspection station which may also be used if desired is the spike detector indicated generally at 430. This inspection station is conveniently located in the pocket 7′ of the finish inspection star wheel 7 adjacent to the finish inspection position 90. At the spike detector station 430, a suitable aperture 431 is formed at the top cover 7‴. A bearing plate 432 is positioned at the aperture 431 and it slidably mounts a spike detector 434 which has a heel 435 at its lower end adapted to engage the container bottom. To permit the rotation of the finish inspection star wheel 7, the spike detector rod 434 is periodically lifted out of the containers 1 by a linkage mechanism which comprises a first link member 436 pivotally connected at 437 to the spike detector rod 434 and at its opposite end 438 to a lifting link 439. Lifting link 439 is pivotally connected at 440 to a suitably fixed mounting post 441 and its undersurface 442 rests on the rounded top 443 of the cam follower rod 64′ so that when the cam follower rod lifts the light tubes 57 and 58 from the container 1, it also raises the lifting link 439 and its connected spike detector rod 434. A suitable contact switch 444 is mounted adjacent to the link 439 so that it remains closed in the event that a spike or other undesirable projection on the bottom of the container 1 raises the spike detector rod 434 more than a predetermined amount above its normally lowered position. Switch 444 operates a spike detector reject relay 445 which in turn moves a spike detector reject arm 446 and its associated memory wheel pin 17 to their reject position. This circuit is also coupled through the proximity switch contacts 186″ so that it is effective only during the period when the finished inspection star wheel 7 is intermediate its stepping movements, at which time the spike detector rod 434 has been lowered to its inspecting position. A counter 450 and an associated indicator lamp 451 are provided to register the total number of containers 1 inspected. The counter 450 and lamp 451 are operated by a suitable sensing means which is illustrated as a switch 452 mounted in chute 9 in FIG. 16. A counter 454 and associated indicator lamp 455 indicate the total number of containers 1 rejected by being energized by a switch 456 operated by the reject arm 15.

*Operation*

The operation of the automatic inspection machine which has been set forth in detatil above in connection with the description of the principal parts of the machine will now be summarized. A supply of containers 1 is fed to the intake conveyor 4 by a suitable feed conveyor or other means not shown. The containers 1 are moved by the intake conveyor 4 into pockets 5′ in the intake star wheel 5, and the intake star wheel 5, which is being stepped at the operating rate of the automatic selector, moves the containers 1 at the operating rate onto the transfer conveyor 6. The transfer conveyor 6 moves the containers from the pockets 5′ of the intake star wheel 5 into the pocket 7′ of the finish inspection star wheel 7. The finish inspection star wheel 7 is also being stepped at the operating rate of the automatic selector which, for purposes of description, has been described as sixty containers per minute.

Each time that the finish inspection star wheel 7 advances one step, a container 1 is positioned on each of the turntables 59 and 60 located beneath the light tubes 57 and 58 at the container finish inspection station 8. The turntables 59 and 60 are rotating at a speed such as fifteen revolutions per second and the containers 1 are therefore rotated at a corresponding speed. As the containers 1 are positioned onto the turntables 59 and 60, the light tubes 57 and 58 are lowered into the containers by the operation of the cam 63 and the mounting arm 61 and its connected cam follower rod 64 so that the light beams from the light tubes 57 and 58 are directed through the containers 1 at their closure engaging finish portions. When a defect is present in the container finish portions, the light beams are reflected at either one or the other of the inspection stations in to the photoelectric cells 104 or 104′. The photoelectric cells translate the reflected light signal to an electric pulse which is amplified by the amplifiers 105 or 105′ so that they operate the memory wheel pin relays 106 or 106′. The memory wheel pin relay 106 rocks the arm 107 so that contact pad 108 on the end of the arm 107 moves the memory wheel pin 17 to its reject position, as seen at 17′ in FIG. 10, and relay 106′ operates in a similar manner.

The memory wheel 16 operates to reject defective containers in the following manner. The memory wheel 16 is rotated in synchronism with the movement of the containers 1 through the automatic selector by being coupled to the automatic selector drive system. In the preferred embodiment illustrated, the memory wheel 16 has fifteen movable memory wheel pins 17 mounted about its circumference and each of these pins corresponds to one of the fifteen containers which are positioned within the automatic selector at any given time. When a container 1 has been moved onto the turntable 59 at the first finish inspection position 90, the memory wheel pin 17 corresponding to this container will be positioned adjacent to the pad 108 on the arm 107 so that the movement of the arm 107 by the memory wheel pin relay 106 of the finish inspection system when a flaw is detected will push the pin 17 inwardly of the memory wheel to its reject position. A second arm 107′ is provided for the second finish inspection position 91 and an additional arm 145 is provided for the body inspection station whose operation will be described below.

Each of the containers 1 is moved from the finish inspection positions 90 and 91 by the finish inspection star wheel 7 to the vertical chute 9 into which the containers are dropped by the finish inspection star wheel 7. The containers 1 drop vertically downwardly through the chute 9 until they are engaged by the rollers 11 at the container body inspection station 10. The three rollers 11 engage the side walls of the containers 1 and spin the containers at high speed with a downwardly movement so that the walls of the container are scanned by the defect detection light means in the body inspection station. In order to provide this downward rotational motion, each of the rollers 11 is tilted slightly from the vertical so that the containers 1 are moved downwardly a predetermined amount each time that they are rotated by the rollers 11. In the body inspection station 10, the walls of each container 1 are scanned by light beams to detect one or more types of objectionable defects therein. In the embodiment illustrated and described above, a visible light beam is used for the purpose of detecting defects such as stones, blisters, laps and vertical marks in the walls of the containers and an ultra violet light beam is used to detect washboards. Additional inspection means may be used as desired.

Thus, in the embodiment illustrated and described, a first relatively narrow light beam from source 136 is directed onto the container 1 through an aperture 135 in the walls of the chute 9 and photoelectric cells 164–168 are each to be activated by diverted or reflected rays from different defects in the container walls. Where either a stone, a blister, a lap or a vertical mark is present, the reflected or diverted light rays will cause an electrical signal in one of the photoelectric cells 164–168 which will operate the rejection arm 198 by means of the solenoid 197 under the control of amplifiers associated with the photoelectric cells. The rejection arm 198 moves the memory wheel pin 17 corresponding to the defective container 1 to its reject position if it has not already been moved thereto at the finish inspection station.

The ultra violet light source 136 cooperates with the photoelectric cells 169 and 170 to also move the memory wheel pin 17 to its reject position by means of the amplifier 171 which similarly operates the memory wheel relay 197 for arm 198 when washboard areas are present on the container 1. The containers 1 now drop to a cushion at the bottom 9′ of the vertical chute 9 within a pocket 12′ of the outlet star wheel 12. The outlet star wheel 12 moves the containers first to a reject arm 15, which removes defective containers which have been detected at the first inspection station of the body inspection station in the following manner.

When each container 1 is moved onto the plate 16 of the reject arm 15 by the outlet star wheel 12, its corresponding memory wheel pin 17 on the memory wheel 16 is positioned at the reject lever control arm 110. If the memory wheel pin 17 has been moved inwardly to its reject position due to the detection of a defect at either the finish inspection station or the body inspection station, pin 17 will engage the reject control arm 110 and will rotate it in a counterclockwise direction (FIG. 1). This movement of the reject lever control arm 110 swings the reject arm 15 outwardly through the intermediation of the interconnetced shafts 111 and 115 and thereby moves the container 1 which is positioned on the reject arm 15 outwardly from the outlet star wheel 12, from which position it is deflected onto a suitable reject chute or conveyor (not shown).

Containers 1 in which no defect has been detected are moved past the reject arm 15 by the outlet star wheel 12 to the outlet conveyor 14 which carries them to suitable container packaging or filling means. Memory wheel pins 17, which have been moved to the inward or reject position, are returned to their normal outward position by a cam 118 as the memory wheel 16 continues to rotate.

The embodiment illustrated in FIGS. 13–15 performs two additional inspections at the gauging station 400 and the spike detector station 430. At the gauging station the containers 1 are rotated while in contact with a gauging arm 416 which senses oversize or undersize containers 1 and which moves the container memory wheel pin 17 to its reject position through relay 419 and arm 420 when an oversize or an undersize container is sensed by gauging arm 416.

At the spike detector station, a detector arm 434 is lowered into each container 1. When the downward movement of the arm 434 is impeded by a vertical spike or projection on the bottom of the container 1, the memory wheel pin 17 is moved to the reject position by switch 444, relay 445, and memory wheel arm 446.

It will be seen that the present invention provides an improved automatic inspection machine which is adapted for continuous automatic inspections at high speeds and which provides for a check of all surfaces of a glass container, including the finish, the shoulder portion, side walls, and the bottom. The machine inspects the various portions of the containers at isolated stations so that the inspections are performed without interference to one another and so that the machine can discriminate between the various types of faults. Records are made of the numbers of each type of fault detected in the containers. The defective containers are rejected from the machine at a single location to provide for convenient container handling. The machine of the invention is also adapted for rugged and compact construction and reliable operation so that it may be coordinated when desired as part of a container manufacturing or a container filling line-up. After being adjusted to handle a particular size container, the automatic inspection machine of the present invention may be safely and conveniently operated at high speeds as an automatic device with a minimum of supervision.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An inspection machine for detecting flaws in the finish and body of glass containers comprising the combination of a finish inspection station, a body inspection station, means for moving glass containers consecutively from one of said stations to the other, means at said finish inspection station to rotate the containers about their vertical axis, means at the body inspection station to move said containers longitudinally along and rotationally about their vertical axis, a light beam at each of said inspection stations directed through the containers, a light responsive means at each inspection station positioned to receive light directed thereto by container flaws, means to record the detection of a flaw at either of said stations, and means to reject glass containers for which a flaw has been recorded at either of said inspection stations.

2. An inspection machine for detecting flaws in glass containers comprising a body inspection station, means for moving a container through said station with combined axial and rotational movement and means to inspect the container body during said movement.

3. The inspection machine as claimed in claim 2 in which said body inspection station comprises a vertical chute and said means for moving said container therethrough comprises a plurality of elongated driven rollers positioned at the sides of said chute to engage the container side walls and to rotate the container about its vertical axis, and each of said rollers having their axes of rotation slightly inclined from the vertical whereby the container engaging surface has a downward component of motion and the containers are moved downwardly and rotated.

4. The inspection machine as claimed in claim 3 in which said rollers are inclined at a relatively small angle of less than one degree from the vertical whereby the rotational velocity of the container side walls is substantially greater than the downward velocity of the container.

5. An inspection machine for automatically inspecting glass containers comprising the combination of means for moving the containers in an upright position over a first path with successive horizontal and rotary motions, means for moving the containers through a second path in an upright position with a downward and rotating motion, container gauging means positioned to detect oversize and undersize containers during a rotary motion of the containers in said first path, first flaw detector means to detect flaws in the container rim and shoulder during the rotary movement of the container in said first path, second flaw detector means to detect flaws in the container body during the downward and rotating movement of the container in said second path, means to record the detection of oversize and undersize containers and of flaws by said detector means, and means operatively coupled to said recorder means to reject oversize and undersize containers and containers having flaws from said inspection machine.

6. The inspection machine as claimed in claim 5 which further comprises switch means electrically connected to said container gauging means and said first and said second flaw detector means to control their operation and means to operate said switch means to activate said container gauging means and said first and said second flaw detector means only when a container is in inspection position thereat.

7. The inspection machine as claimed in claim 6 in which said switch means comprise proximity switches and said means to operate them are rotating cams coupled to and synchronized with the means for moving the containers over said paths.

8. An inspection machine for automatically inspecting glass containers comprising the combination of means for moving the containers in an upright position over a first path with successive horizontal and rotary motions, means synchronized with said first said means for moving the containers through a second path in an upright position longitudinally along and rotationally about their vertical axis, container gauging means positioned to detect oversize and undersize containers during the motion of containers in said first path, spike detecting means positioned to detect projections on the container bottoms during the movement of the containers in said first path, first flaw detector means to detect flaws in the container rim and shoulder during the rotary movement of the container in said first path, second detector means to detect flaws in the container body during the longitudinal and rotational movement of the container in said second path, means to record the detection of oversize or undersize containers and of spikes and of flaws by said detector means, means operated by said recorder means to eject oversize or undersize containers or containers having spikes and having flaws from said inspection machine, and switch means connected to said container gauging means and said spike detecting means and said first and said second flaw detecting means to activate them only when a container is in position thereat.

9. The inspection machine as claimed in claim 8 in which said switch means comprise proximity switches and cooperating metal cams coupled to and synchronized with the means for moving the containers over said paths.

10. The inspection machine as claimed in claim 5 in which said container gauging means comprises a gauging roller adapted to resiliently engage a portion of the container surface, gauging roller mounting means movably mounted adjacent said first path having a resilient member coupled thereto to hold said gauging roller against the container, and normally open electrical switch means connected to said mounting means and adapted to be closed by the movement of said mounting means for oversized and undersized containers.

References Cited in the file of this patent

UNITED STATES PATENTS

| | | |
|---|---|---|
| 1,480,390 | Hartness | Jan. 8, 1924 |
| 2,085,671 | Powers | June 25, 1937 |
| 2,138,645 | Rey | Nov. 29, 1938 |
| 2,393,188 | Reynolds | Jan. 15, 1946 |
| 2,481,863 | Owens | Sept. 13, 1949 |
| 2,542,090 | Lorenz | Feb. 20, 1951 |
| 2,582,494 | Lorenz | Jan. 15, 1952 |
| 2,606,657 | Berthelsen | Aug. 12, 1952 |
| 2,643,767 | Baker | June 30, 1953 |
| 2,651,412 | Aller | Sept. 8, 1953 |
| 2,663,421 | Reynolds | Dec. 22, 1953 |
| 2,679,317 | Roop | May 25, 1954 |
| 2,791,696 | Schell | May 7, 1957 |
| 2,879,407 | Cox | Mar. 24, 1959 |
| 2,902,151 | Miles | Sept. 1, 1959 |